(12) United States Patent
Kawai

(10) Patent No.: US 7,707,228 B2
(45) Date of Patent: Apr. 27, 2010

(54) LOG MANAGEMENT DEVICE

(75) Inventor: Sunao Kawai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 11/235,308

(22) Filed: Sep. 27, 2005

(65) Prior Publication Data

US 2006/0069691 A1  Mar. 30, 2006

(30) Foreign Application Priority Data

Sep. 30, 2004 (JP) .............................. 2004-289137

(51) Int. Cl.
*G06F 7/00* (2006.01)
*G06F 17/00* (2006.01)

(52) U.S. Cl. ...................... 707/802; 707/809

(58) Field of Classification Search ................ 707/3–5, 707/100, 791, 795, 796, 802, 807, 809; 709/225; 715/202

See application file for complete search history.

(56) References Cited

U.S. PATENT DOCUMENTS

| | | | |
|---|---|---|---|
| 5,282,127 A | | 1/1994 | Mii |
| 5,631,724 A | | 5/1997 | Sawada et al. |
| 5,933,675 A | | 8/1999 | Sawada et al. |
| 5,982,995 A | | 11/1999 | Covert et al. |
| 6,571,285 B1 * | 5/2003 | Groath et al. ............ 709/223 |
| 6,772,396 B1 * | 8/2004 | Cronin et al. ............ 715/202 |
| 6,985,901 B1 * | 1/2006 | Sachse et al. ............ 707/10 |
| 7,124,135 B1 * | 10/2006 | Turba et al. ............ 707/100 |
| 7,155,514 B1 * | 12/2006 | Milford ............ 709/225 |
| 7,200,588 B1 * | 4/2007 | Srivastava et al. ............ 707/3 |
| 2002/0069028 A1 * | 6/2002 | Merz et al. ............ 702/127 |
| 2002/0138612 A1 | 9/2002 | Sekizawa |
| 2003/0225604 A1 * | 12/2003 | Casati et al. ............ 707/7 |
| 2003/0233427 A1 | 12/2003 | Taguchi |
| 2004/0167912 A1 * | 8/2004 | Tsui et al. ............ 707/100 |
| 2004/0254919 A1 * | 12/2004 | Giuseppini ............ 707/3 |
| 2005/0256908 A1 * | 11/2005 | Yang et al. ............ 707/200 |
| 2006/0230319 A1 * | 10/2006 | Ryali et al. ............ 714/38 |

FOREIGN PATENT DOCUMENTS

EP  1 338 928  8/2003
JP  03-161763 A  7/1991

(Continued)

OTHER PUBLICATIONS

Examination Report dated Jan. 21, 2007 in European Application No. EP 05 256 071.1.

(Continued)

*Primary Examiner*—Hung T Vy
(74) *Attorney, Agent, or Firm*—Banner & Witcoff, Ltd

(57) ABSTRACT

A computer program product includes computer accessible instructions that cause a computer to carry out the steps of (a) retrieving a log file from a log file storage that stores log data output by at least one device as the log file and (b) converting the log data contained in the retrieved log file in accordance with a script that is stored in a script storage to output a registration file to be registered with a database. The script includes a description of conversion information, and the registration file is generated in accordance with a standardized language specification.

22 Claims, 18 Drawing Sheets

FOREIGN PATENT DOCUMENTS

| | | |
|---|---|---|
| JP | 03-293373 A | 12/1991 |
| JP | 08-179896 | 7/1996 |
| JP | 11-265395 | 9/1999 |
| JP | 2000-035975 | 2/2000 |
| JP | 2000-207254 | 7/2000 |
| JP | 2002-041579 | 2/2002 |
| JP | 2003-076680 | 3/2003 |
| JP | 2004-015589 | 1/2004 |
| JP | 2004-102759 | 4/2004 |

OTHER PUBLICATIONS

Koji Yonekura, "Steady Learning from Basics with Sample Codes, XML Workshop is Now Open, Chapter 9 Association with Database".

Notification of Reasons of Rejections, Application No. 2004-289137, Date of Dispatch Jul. 1, 2008.

* cited by examiner

FIG. 12

View Maintenance Information  } 1st line

Name,Device_Type,IP_Address,Location,Contact,Serial_Number,MAC_Address,Date,Page_Count,Drum_Unit_Remaining_Life,Black_Coverage,Black_Toner_Replace_Count,Drum_Unit_Replace_Count,Total_Pages_Printed_TRAY_1,Total_Pages_Printed_MP_TRAY,Jam_Total,PrintPageCount_A4_Letter,PrintPageCount_Legal,PrintPageCount_B5_Exe,PrintPageCount_Envelopes,PrintPageCount_Others  } 2nd line "PRN_355618","Br H-57N series","10.20.100.206","5F","123-2345","A00000001","008077355618","Fri Apr 16 11:01:03 2004",1904,18096,0.69,,0,1629,276,3,1867,33,0,0,5  } 3rd line "PRN_224156","Br H-65D_DN series","10.20.150.61","3F","123-5432","B00000001","008077224156","Fri Apr 16 11:01:04 2004",213,28962,2.3,1,0,201,12,12,201,0,12,0,0  } 4th line "PRN_355619","Br H-57N series","10.20.100.205","5F","123-2345","A00000002","008077355619","Fri Apr 16 11:01:05 2004",902,17098,1.52,,0,1629,1276,11,1872,1033,0,0,0  } 5th line

Script Edit

| Field | Value | # |
|---|---|---|
| InFile | printlog. csv | 402 |
| OutFile | sql/printlog.sql | 403 |
| FieldTable | Page Count A4.PrintPageCount_A4<br>Page Count Letter.PrintPageCount_Letter<br>Device Name.Printer_Name | 404 |
| MultiField |  | 405 |
| DatabaseName | WBA_DB | 406 |
| DatabaseDescription | #Create database(%s)of PrinterAdmin<br>CREATE DATABASE IF NOT EXISTS %s:<br>#select database(%s)<br>USE %s | 407 |
| TableName | WBA_NP_Maintenance | 408 |
| TableDescription | #Create table %s of PrinterAdmin in WBA_DB<br>CREATE TABLE IF NOT EXISTS %s<br>    ID MEDIUM INT(S) UNSIGNED DEFAULT "0" NOT NULL AUTO INCREMENT. | 409 |
| RecordsHeader | REPLACE INTO %s<br>SET | 410 |
| FieldName | Name.1<br>Device_Type,1<br>IP_Address,1<br>Location,1 | 411 |
| RecordsFooter | : | 412 |

[ CANCEL ] 413      [ OUTPUT ] 414

FIG. 14

```
 1 : <Template>
 2 : <InFile>
 3 : printlog.csv
 4 : <OutFile>
 5 : sql¥¥printlog.sql
 6 : <DatabaseName>
 7 : WBA_DB
 8 : <DatabaseDescription>
 9 : #Create database(%s) of PrinterAdmin
10 : CREATE DATABASE IF NOT EXISTS %s ;
11 : #select database(%s)
12 : USE %s ;
13 : <TableName>
14 : WBA_NP_Maintenance
15 : <TableDescription>
16 : #Create table %s of PrinterAdmin in WBA_DB
17 : CREATE TABLE IF NOT EXISTS %s(
18 :     ID MEDIUMINT(8) UNSIGNED DEFAULT '0' NOT NULL AUTO_INCREMENT,
19 :     Name VARCHAR(255),
20 :     Device_Type VARCHAR(255),
21 :     IP_Address VARCHAR(16),
22 :     Location VARCHAR(255),
23 :     Contact VARCHAR(255),
24 :     Serial_Number VARCHAR(255),
25 :     MAC_Address VARCHAR(255),
26 :     Date VARCHAR(255),
27 :     Page_Count MEDIUMINT(7) UNSIGNED,
28 :     Drum_Unit_Remaining_Life MEDIUMINT(7) UNSIGNED,
29 :     Black_Coverage FLOAT(4),
30 :     Black_Toner_Replace_Count MEDIUMINT(3) UNSIGNED,
31 :     Drum_Unit_Replace_Count MEDIUMINT(3) UNSIGNED,
32 :     Total_Pages_Printed_TRAY_1 MEDIUMINT(7) UNSIGNED,
33 :     Total_Pages_Printed_MP_TRAY MEDIUMINT(7) UNSIGNED,
34 :     Jam_Total MEDIUMINT(7) UNSIGNED,
35 :     PrintPageCount_A4_Letter MEDIUMINT(7) UNSIGNED,
36 :     PrintPageCount_Legal MEDIUMINT(7) UNSIGNED,
37 :     PrintPageCount_B5_Exe MEDIUMINT(7) UNSIGNED,
38 :     PrintPageCount_Envelopes MEDIUMINT(7) UNSIGNED,
39 :     PrintPageCount_Others MEDIUMINT(7) UNSIGNED,
40 :     PRIMARY KEY (ID)
41 : );
42 : <TableData>
43 : View Maintenance Information
44 : <FieldTable>
45 : Printed Pages A4/LETTER,PrintPageCount_A4_Letter
46 : Printed Pages OTHER,PrintPageCount_Others
```

FIG. 15

47 : <FieldName>
48 : Name,1
49 : Device_Type,1
50 : IP_Address,1
51 : Location,1
52 : Contact,1
53 : Serial_Number,1
54 : MAC_Address,1
55 : Date,1
56 : Page_Count,2
57 : Drum_Unit_Remaining_Life,2
58 : Black_Coverage,2
59 : Black_Toner_Replace_Count,2
60 : Drum_Unit_Replace_Count,2
61 : Total_Pages_Printed_TRAY_1,2
62 : Total_Pages_Printed_MP_TRAY,2
63 : Jam_Total,2
64 : PrintPageCount_A4_Letter,2
65 : PrintPageCount_Legal,2
66 : PrintPageCount_B5_Exe,2
67 : PrintPageCount_Envelopes,2
68 : PrintPageCount_Others,2
69 : <RecordsHeader>
70 : REPLACE INTO %s
71 : SET
72 : <RecordsFooter>
73 : ;
74 : </Template>

FIG. 16

```
1 : #Create database(WBA_DB) of PrinterAdmin
2 : CREATE DATABASE IF NOT EXISTS WBA_DB ;
3 : #delect database(WBA_DB)
4 : USE WBA_DB ;
5 : #Create table WBA_NP_Maintenance of PrinterAdmin in WBA_DB
6 : CREATE TABLE IF NOT EXISTS WBA_NP_Maintenance(
7 :      ID MEDIUMINT(8) UNSIGNED DEFAULT '0' NOT NULL AUTO_INCREMENT,
8 :      Name VARCHAR(255),
9 :      Device_Type VARCHAR(255),
10 :     IP_Address VARCHAR(16),
11 :     Location VARCHAR(255),
12 :     Contact VARCHAR(255),
13 :     Serial_Number VARCHAR(255),
14 :     MAC_Address VARCHAR(255),
15 :     Date VARCHAR(255),
16 :     Page_Count MEDIUMINT(7) UNSIGNED,
17 :     Drum_Unit_Remaining_Life MEDIUMINT(7) UNSIGNED,
18 :     Black_Coverage FLOAT(4),
19 :     Black_Toner_Replace_Count MEDIUMINT(3) UNSIGNED,
20 :     Drum_Unit_Replace_Count MEDIUMINT(3) UNSIGNED,
21 :     Total_Pages_Printed_TRAY_1 MEDIUMINT(7) UNSIGNED,
22 :     Total_Pages_Printed_MP_TRAY MEDIUMINT(7) UNSIGNED,
23 :     Jam_Total MEDIUMINT(7) UNSIGNED,
24 :     PrintPageCount_A4_Letter MEDIUMINT(7) UNSIGNED,
25 :     PrintPageCount_Legal MEDIUMINT(7) UNSIGNED,
26 :     PrintPageCount_B5_Exe MEDIUMINT(7) UNSIGNED,
27 :     PrintPageCount_Envelopes MEDIUMINT(7) UNSIGNED,
28 :     PrintPageCount_Others MEDIUMINT(7) UNSIGNED,
29 :     PRIMARY KEY (ID)
30 : );

31 : REPLACE INTO WBA_NP_Maintenance
32 : SET Name='PRN_355618',
33 : Device_Type='Br H-57N series',
34 : IP_Address='10.20.100.206',
35 : Location='5F',
36 : Contact='123-2345',
37 : Serial_Number='A00000001',
38 : MAC_Address='112277355618'
39 : Date='Fri Apr 16 11:01:03 2004',
40 : Page_Count=1904,
41 : Drum_Unit_Remaining_Life=18096,
42 : Black_Coverage=0.69,
43 : Black_Toner_Replace_Count=null,
44 : Drum_Unit_Replace_Count=0,
45 : Total_Pages_Printed_TRAY_1=1629,
46 : Total_Pages_Printed_MP_TRAY=276,
47 : Jam_Total=3,
48 : PrintPageCount_A4_Letter=1867,
49 : PrintPageCount_Legal=33,
50 : PrintPageCount_B5_Exe=0,
51 : PrintPageCount_Envelopes=0,
52 : PrintPageCount_Others=5;
```

FIG. 17

```
53 : REPLACE INTO WBA_NP_Maintenance
54 : SET Name='PRN_224156',
55 : Device_Type='Br H-65D_DN series',
56 : IP_Address='10.20.150.61',
57 : Location='3F',
58 : Contact='123-5432',
59 : Serial_Number='B00000001',
60 : MAC_Address='112277224156'
61 : Date='Fri Apr 16 11:01:04 2004',
62 : Page_Count=213,
63 : Drum_Unit_Remaining_Life=28962,
64 : Black_Coverage=2.3,
65 : Black_Toner_Replace_Count=1,
66 : Drum_Unit_Replace_Count=0,
67 : Total_Pages_Printed_TRAY_1=201,
68 : Total_Pages_Printed_MP_TRAY=12,
69 : Jam_Total=12,
70 : PrintPageCount_A4_Letter=201,
71 : PrintPageCount_Legal=0,
72 : PrintPageCount_B5_Exe=12,
73 : PrintPageCount_Envelopes=0,
74 : PrintPageCount_Others=0;

75 : REPLACE INTO WBA_NP_Maintenance
76 : SET Name='PRN_355619',
77 : Device_Type='Br H-57N series',
78 : IP_Address='10.20.100.205',
79 : Location='5F',
80 : Contact='123-2345',
81 : Serial_Number='A00000002',
82 : MAC_Address='112277355619'
83 : Date='Fri Apr 16 11:01:05 2004',
84 : Page_Count=2902,
85 : Drum_Unit_Remaining_Life=17098,
86 : Black_Coverage=1.52,
87 : Black_Toner_Replace_Count=null,
88 : Drum_Unit_Replace_Count=0,
89 : Total_Pages_Printed_TRAY_1=1629,
90 : Total_Pages_Printed_MP_TRAY=1276,
91 : Jam_Total=11,
92 : PrintPageCount_A4_Letter=1872,
93 : PrintPageCount_Legal=1033,
94 : PrintPageCount_B5_Exe=0,
95 : PrintPageCount_Envelopes=0,
96 : PrintPageCount_Others=0;
```

LOG MANAGEMENT DEVICE

CROSS REFERENCE TO REFERENCE APPLICATIONS

This application claims priority from Japanese Patent Application No. 2004-289137, filed on Sep. 30, 2004, which is herein incorporated herein by reference.

BACKGROUND

1. Technical Field

Aspects of illustrative embodiment relate to log management device and log management program that applies a predetermined operation to log data collected from devices such as copiers and MFP (Multi Function Peripherals).

2. Related Art

Conventionally, there is known a network system in which a problem has occurred in a terminal device such as a copier connected to a network, and the number of occurrences of such a problem is indicated in a management device that remotely manages the terminal devices. Since only the number of occurrences is indicated, a serviceperson who is supposed to carry out maintenance of the terminal devices cannot recognize the portions of the device having the problem and/or status of the problem remotely. Therefore, the serviceperson cannot determine whether some parts need to be exchanged and/or what parts need to be exchanged.

Japanese Patent Provisional Publication No. HEI 3-161763 discloses a technique to deal with such a situation. According to the technique as disclosed, various pieces of information (e.g., the number of copied sheets, a photosensitive voltage, a bias voltage, a temperature of a heat roller, presence/absence of errors, an error code, information regarding exchangeable parts, etc.) related to the copier are transmitted to a center device by a communication unit that is connected to the copier at a predetermined time (e.g., when a disorder has occurred). Upon receipt of such information, the center device converts the information into data having a predetermined format and stores the same as a data file. When necessary, the center device retrieves the data file, applies necessary processing, and displays the processed data on a display unit. With this configuration, the serviceperson can review a status of the problem, error history and the like from the displayed information, and can judge whether some parts of the copier should be exchanged.

Recently, as network systems have become well developed and widely used, it has become possible to obtain information (e.g., log data) for terminal devices at remote locations. With this development, there arises a desire to register the log data in a database and to analyze the registered data in accordance with various aspects using analyzing tools in order to prevent occurrence of problems in advance and/or manage operation status of each terminal device.

It would be convenient in registering data in the database if the log data transmitted from each terminal device has a predetermined standard format (e.g., SQL file).

However, SQL files for well-known database management systems (DBMS) have different specifications depending on vendors. Further, names of tables and items used by analyzing tools may also be different from each other. Therefore, it is necessary that each terminal outputs the log data in conformity with the specification of the SQL file of the DBMS. In other words, in order that a terminal device can be employed in various DBMSs, it is necessary that a plurality of types of SQL files respectively corresponding to the DMBSs. Accordingly, programs that generate the SQL files respectively corresponding to the DBMSs should generally be prepared. However, preparing programs is burdensome. Further, when programs are used, it is difficult to make even a slight modification (e.g., a change of a table name) flexibly.

The above problem occurs when the terminal is any device that transmits log data to be registered with a database including a copier, a printer, a scanner, a facsimile machine, a camera, an MFP having functions of some of such devices, an image forming device and the like.

SUMMARY

Aspects of an illustrative embodiment may be advantageous in that a method, a device and/or a program product may be provided, which makes it possible to convert the log data collected from terminal devices to various types of data corresponding to respective DBMS, with less troublesome effort.

BRIEF DESCRIPTION OF THE DRAWINGS

FIG. 12 is an example of a maintenance long of a network device;

FIG. 13 is a data input window allowing a user to input data necessary for generating a script according to aspect of an illustrative embodiment;

FIG. 14 is an example of a script according to an aspect of an illustrative embodiment;

FIG. 15 is another example of a script according to an aspect of an illustrative embodiment;

FIGS. 16-17 show an example of a registration file according to an aspect of an illustrative embodiment;

DETAILED DESCRIPTION

General Overview

Figure 1:
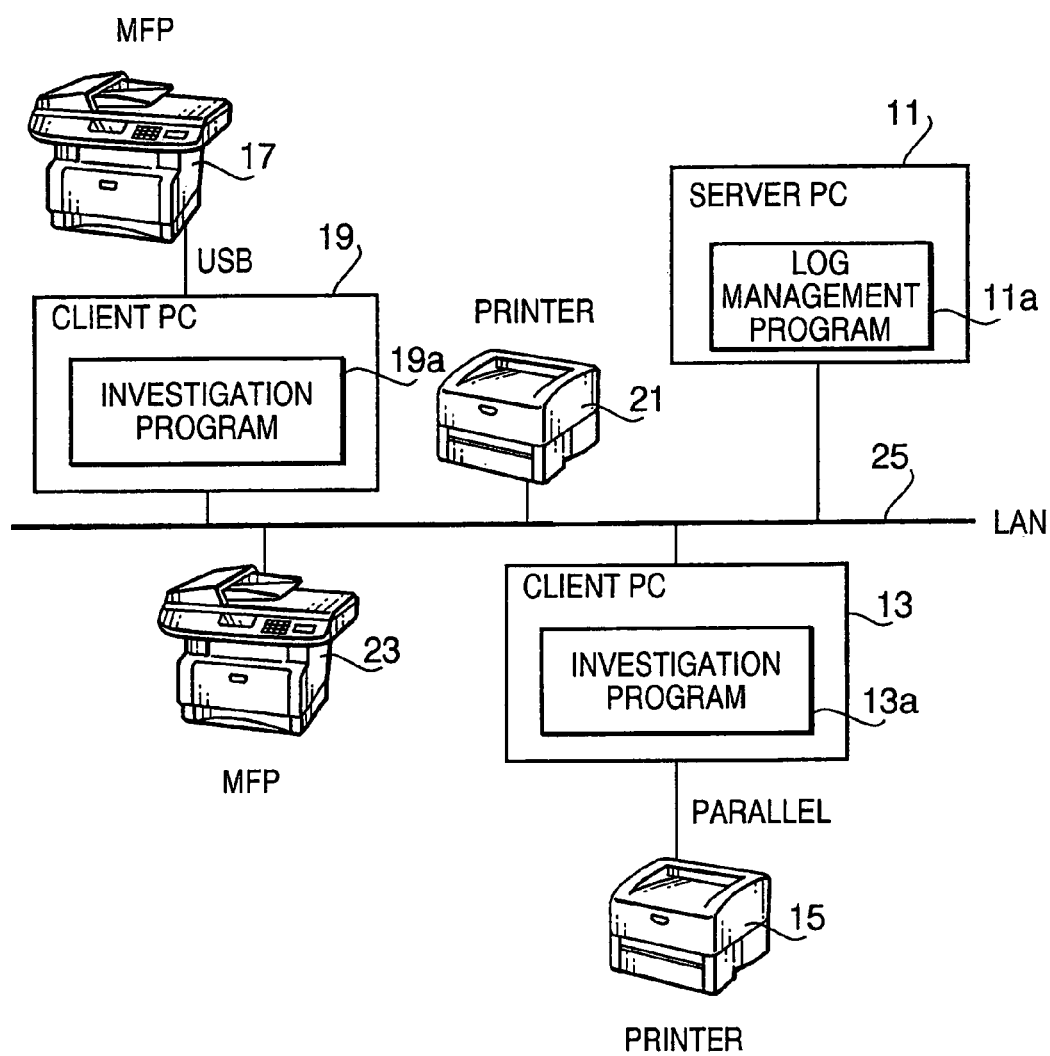
FIG. 1 schematically shows a configuration of a log management system according to an illustrative embodiment.

The following describes general aspects that may or may nor be included in various embodiments/modifications. Also, it is noted that various connections are set forth between elements in the following description. It is noted that these connections in general and, unless specified otherwise, may be direct or indirect and that this specification is not intended to be limiting in this respect.

There is provided a computer program product comprising computer accessible instructions that cause a computer to carry out the steps of retrieving a log file from log file storage that stores log data output by at least one device as the log file and converting the log data contained in the retrieved log file in accordance with a script that is stored in a script storage to output a registration file to be registered with a database. The script includes a description of conversion information, and the registration file is generated in accordance with a specification of standardized language. The standardized language may be, for example, SQL.

According to the log management program product, by preparing an appropriate script corresponding to the database, it becomes possible to generate a registration file suitable for the destination database. Since such a script can be prepared more easily than a program for converting the log data to a suitable registration file, the program product is advantageous and can generally be used. In particular, if there are a plurality of destination databases, using the script is convenient, and lessens the burden to the system administrator and the like.

Further, if the corresponding table names and/or corresponding items are described when the table names and/or item names are changed such a change can be dealt with by modifying a part of the script. Therefore, the amount of troublesome work of the administrator may be reduced.

The log files stored in the log file storage may have a single format. However, if there are a plurality of devices that output the log files, they may have different formats. That is, the log file storage stores a plurality of log files corresponding to the plurality of devices, respectively, where a plurality of pieces of log data are contained in the plurality of log files have different formats corresponding to a plurality of types of information provided by the plurality of devices. To handle such log files, the script stored in the script storage may be configured to describe the conversion information corresponding to the plurality of types of information, and the step of converting may further include the steps of retrieving the log files from the log file storage, and carrying out the conversion in accordance with the conversion information contained in the script corresponding to the log data to output the registration file.

It should be noted that the log file stored in the log file storage may be a single file including a plurality of pieces of log data having different formats, or a plurality of files having different formats.

According to the above configuration, even if the log file(s) stored in the log file storage includes a plurality of pieces of log data having different formats, a registration file which can be registered with a single destination database can be generated.

It should be noted that the types of information provided by the plurality of devices may depend on at least one of methods of storing the log data of respective devices and a method of providing the log data of respective devices.

It is noted that the device may be directly connected with the network and that the log data may be directly output on the network, or the device may be connected to a personal computer and the log data may be collected by the personal computer and then output on the network. In such a case, that is, if the log data is provided from the device in accordance with a different method, the format of the log data may vary. Further, the format of the log data stored in the device and the format of the log data generated by a log management program, which collects necessary information from the device and generates the log data, may be different.

Optionally, the types of information provided by the plurality of devices may depend on types of respective devices. That is, depending on differences of grades of the devices, purposes of the devices and/or differences in sales launch, the quality/quantity of information provided by the devices may be different, which may differentiate the format of the log data.

As above, if the log data having a plurality of different formats can be included in the log file and handled correctly, the program product can be wide spread.

Generally, in view of management of computer programs, registration files are generated corresponding to the types of the log data. However, if the destination database has a single table, it would be convenient if only a single table is included in the registration file.

Therefore, the script stored in the script storage may include information regarding items described in a table that is generated by conversion corresponding to the log data for each device, and the step of converting may carry out the conversion such that the description of the information regarding the table items to be registered in the registration file is a description that can be registered in a single table.

With the above configuration, a plurality of pieces of log data having different formats can be registered with a single table. In such a case, it is no longer necessary to collect various pieces of data registered with a plurality of tables (corresponding to different data formats), thereby reducing the burden on the administrator.

Further optionally, the script stored in the script storage may describe information regarding registration of at least one piece of the plurality of pieces of log data in a plurality of tables, and the step of converting may carry out the conversion such that the registration file is generated from at least one piece of the plurality of pieces of log data.

With the above configuration, the same log data which is required by a plurality of tables can be registered with the respective tables. In such a case, an operation for referring to a table from another table after registration can be avoided, and burden on the administrator can be reduced.

It should be noted that the device may include any device which can output the log data. In a particular case, the device is an image forming device. Generally, the image forming device is provided with a photoreceptor roller, a sheet feeding mechanism and the like. Further, the image forming device requires relatively troublesome maintenance (e.g., exchange of toner cartridges depending on the remaining toner amount) in comparison with other devices. Therefore, it is convenient if a problem can be predicted by analyzing the log data. For example, a prediction of when the toner cartridges will need to be changed has been desired. Therefore, the above program product is particularly convenient in the field of image forming device.

Optionally, the computer program product may further include instructions to cause the computer to carry out a steps of obtaining one of the log data and a log file containing the log data and storing the one of the log data and the log file in the log file storage.

If such a configuration is implemented, it no longer becomes necessary to prepare a system and a process for collecting the log data from the devices and storing the same in the log file storage in addition to the above described registration operation.

Further optionally, the computer program product may further include instructions to cause the computer to carry out a step of generating the script based on information input through a graphical user interface and storing the script in the script storage.

With such a configuration, it becomes easier to create the script, which reduces the burden on the administrator, and raises the availability of the computer program product.

According to another aspect, there is provided a log management server capable of executing computer accessible instructions. The server executes computer accessible instructions that cause the server to carry out the steps of retrieving a log file from a log file storage that stores log data output by at least one device as the log file, and converting the log data contained in the retrieved log file in accordance with a script that is stored in a script storage to output a registration file to be registered with a database, the script including description of conversion information, the registration file being generated in accordance with a standardized language specification.

According to a further aspect, there is provided a log management system, which is provided with at least one device that outputs log data, a log management server having file storage that stores the log data output by the at least one device and script storage that stores a script containing conversion information, a log management server that executes computer accessible instructions that cause the server to carry out the steps of retrieving a log file from the log file storage, and converting the log data contained in the retrieved log file in accordance with the script stored in the script storage to output a registration file to be registered with a database, the registration file being generated in accordance with a standardized language specification.

According to another aspect, there is provided a method of converting a log file into a registration file to be registered with a database, the method includes the steps of retrieving the log file from a log file storage that stores log data output by at least one device as the log file, and converting the log data contained in the retrieved log file in accordance with a script that is stored in a script storage t standardized language o output the registration file, the script including description of conversion information, the registration file being generated in accordance with a specification of.

According to a further aspect, there is provided a computer program including instructions to be executed by a computer, the computer program, when executed by the computer, carrying out a method of converting a log file into a registration file to be registered with a database. The method may include a step of retrieving the log file from log file storage that stores log data output by at least one device as the log file and a step of converting the log data contained in the retrieved log file in accordance with a script that is stored in script storage to output the registration file, the script including a description of conversion information, the registration file being generated in accordance with a standardized language specification.

Illustrative Embodiment

Referring now to the drawings, a description will be given in detail of a facsimile machine according to an illustrative embodiment.

FIG. 1 shows a configuration of a log management system according to an illustrative embodiment. The log management system includes a server PC (personal computer) 11, a client PC 13, a client PC 19, a printer 21, and an MFP (multi function peripheral) 23, which are connected to a LAN (local area network) 25. The log management system further includes a printer 15 connected to the client PC 13 via a parallel cable, and an MFP 17 connected to the client PC 19 via a USB (universal serial bus) cable.

Figure 2:
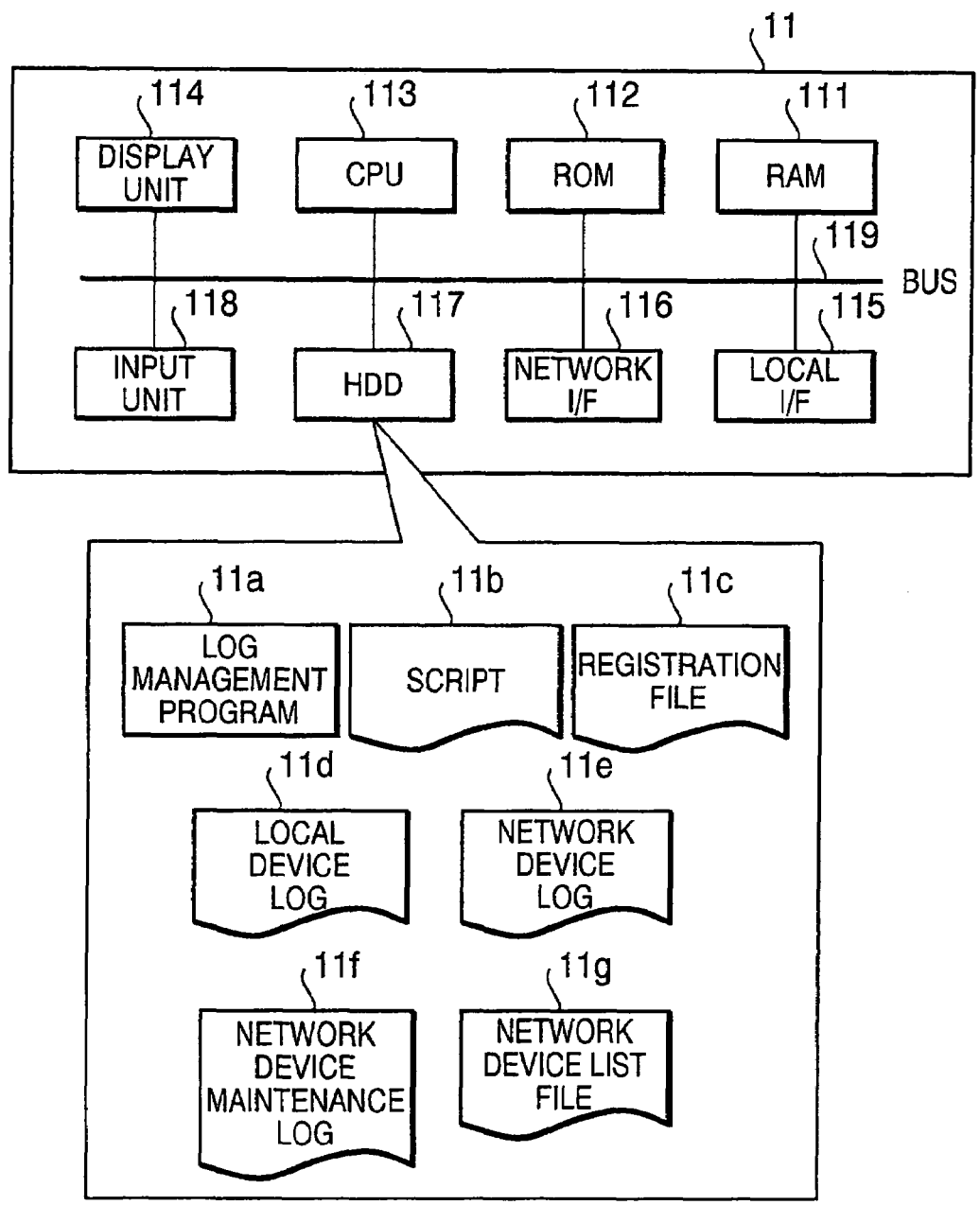
FIG. 2 is a block diagram of an illustrative server PC employed in the log management system shown in FIG. 1.

The server PC 11 stores a log management program 11a, which can be executed by the server PC 11. FIG. 2 is a block diagram schematically showing a configuration of the server PC 11. The server PC 11 has a RAM (random access memory) 111 that servers as a temporary storage for a program when loaded (a type of computer-readable medium), a ROM (read only memory) 112 (a type of computer-readable medium) for storing main programs, a CPU (central processing unit) 113 which executes various programs, and a display unit 114 having, for example, an LCD (liquid crystal display), a local I/F (interface) 115 capable of communicating with external devices through a parallel cable or a USB cable, a network I/F 116 capable of communicating with external devices through a network such as Ethernet®, an HDD (hard disk drive) 117 (a type of computer-readable medium) for storing application programs and log files, an input unit 118 having a keyboard and a mouse, and a bus 119 interconnecting the above elements. It should be noted that the configuration shown in FIG. 2 is only an exemplary configuration, and various modifications can be made. For example, the display unit 114 and the input unit 118 may be replaced with external terminal devices which are connected to the server PC 11 through the network I/F 116.

The HDD 117 stores the log management program 11a, and a script 11b which is read by the CPU 113 when the log management program 11a is executed. The HDD 117 further stores a registration file 11c output by the log management program 11a based on log files (described later), a local device log 11d, a network device log 11e, a network device maintenance log 11f, and a network device list file 11g.

The local device log 11d is output by the log management program 11a. Specifically, the log management program 11a collects log files from locally connected printers and MFPs through a PC directly connected to the network. The network device log 11e is a log file generated as the log management program 11a collects log files stored in printers and MFPs directly connected to the network, and is output by the log management program 11a. The network device maintenance log 11f is a log file generated as the log management program 11a obtains maintenance information from printers and MFPs directly connected to the network, and is output by the log management program 11a. The network device list file is a file generated in accordance with list of information regarding the printers and MFPs directly connected to the network.

According to the embodiment, the script 11b and the registration file 11c are text files, while each of the local device log 11d, the network device log 11e, the network device maintenance log 11f and the network device list file 11g is a CSV file. The registration file 11c is described in accordance with an SQL description rule.

Figure 3:
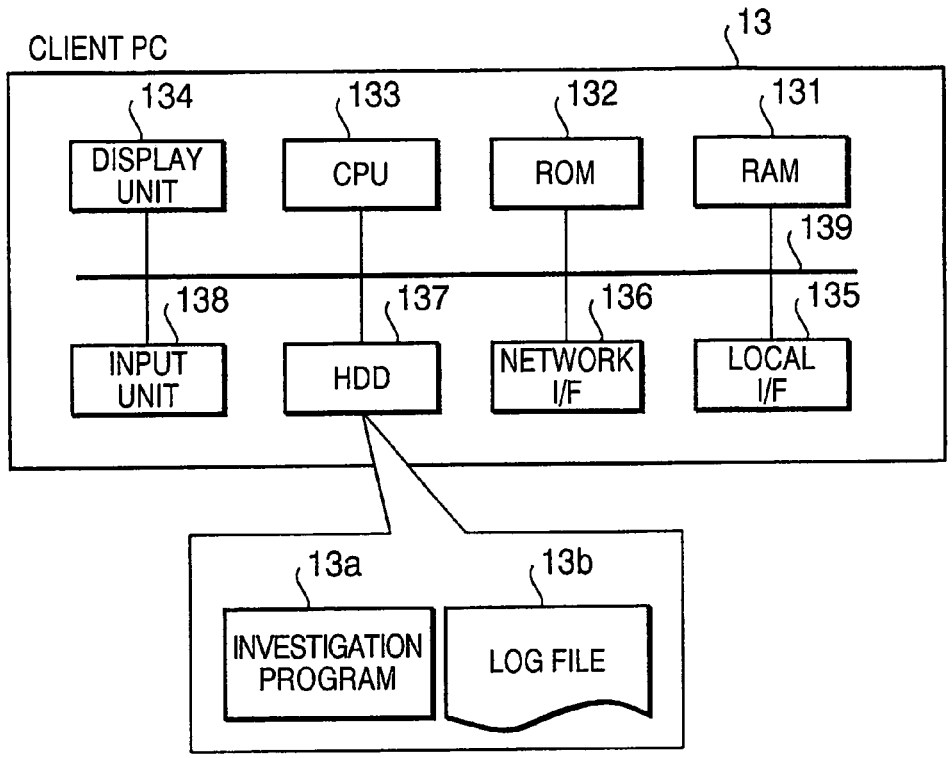
FIG. 3 is a block diagram of an illustrative client PC employed in the log management system shown in FIG. 1.

Back to FIG. 1, the client PC 13 stores an investigation program 13a, which can be executed by the client PC 13. FIG. 3 is a block diagram showing a configuration of the client PC 13. The client PC 13 includes a RAM 131 which is used as a temporary memory when programs are load and executed, a ROM 132 storing main programs, a CPU 133 for executing the programs, a display unit 134 including, for example, an LCD, to display images, a local I/F 135 locally connectable with external devices through a parallel cable or USB cable, a network I/F 136 connectable with external devices through a network such as Ethernet®, an HDD 137 for storing application programs and/or log files, an input unit 138 having a keyboard and a mouse, and a bus 139 interconnecting the above elements. The HDD 137 stores an investigation program 13a which is executed to check printers and MFPs locally connected to the client PC 13, and a log file 13b for storing information (i.e., log data) collected from connected printers and MFP, by the investigation program 13a.

Figure 4:
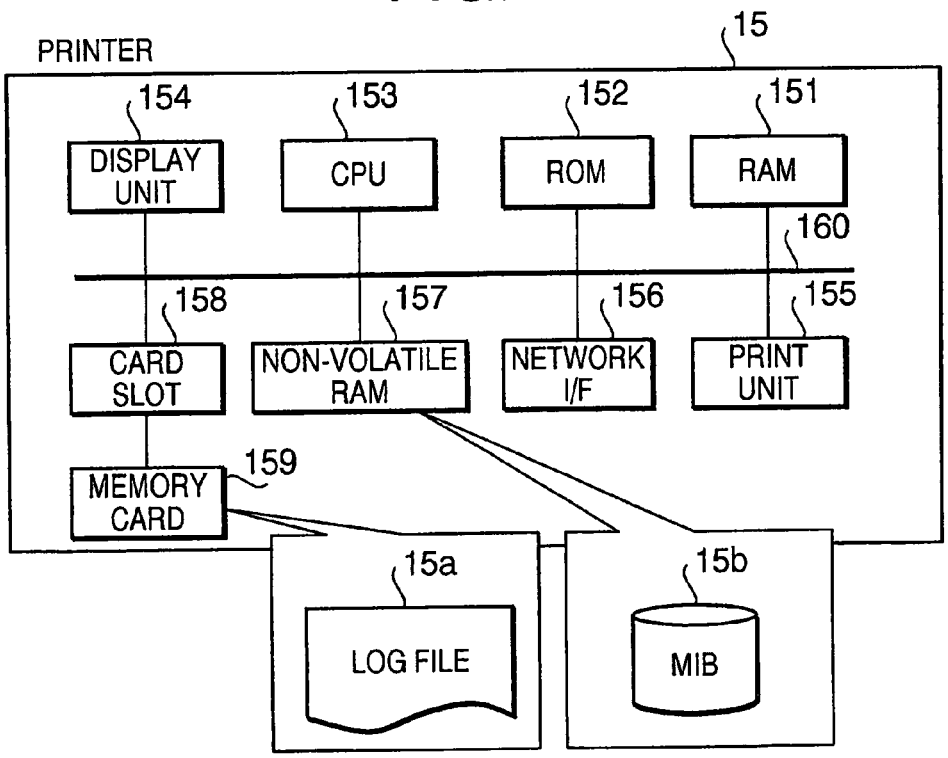
FIG. 4 is a block diagram of an illustrative printer employed in the log management system shown in FIG. 1.

As shown in FIG. 1, the printer 15 is connected to the client PC 13 via the parallel cable, and mainly operates in accordance with commands issued by the client PC 13. FIG. 4 is a block diagram showing a configuration of the printer 15. The printer 15 includes a RAM 151 mainly used as temporary storage when programs are loaded and executed, a ROM 152 for storing various programs, a CPU 153 which executes the programs, a display unit 154 having, for example, an LCD, to display images, a printing unit 155 which carries out a printing operation on a printing medium, a network I/F 156 which can be connected to external devices through a parallel cable, a USB cable or Ethernet cable, a non-volatile RAM 157 for storing an MIB (Management Information Base) 15b that is information (log data) notifying status and the like of the printer 15 to external devices, a card slot 158 which is a slot provided with an interface to a memory card 159, and a bus 160 interconnecting the above elements. In the card slot 158, a memory card 159 storing a log file 15a containing information (log data) related to the printer 15 is set.

Figure 5:
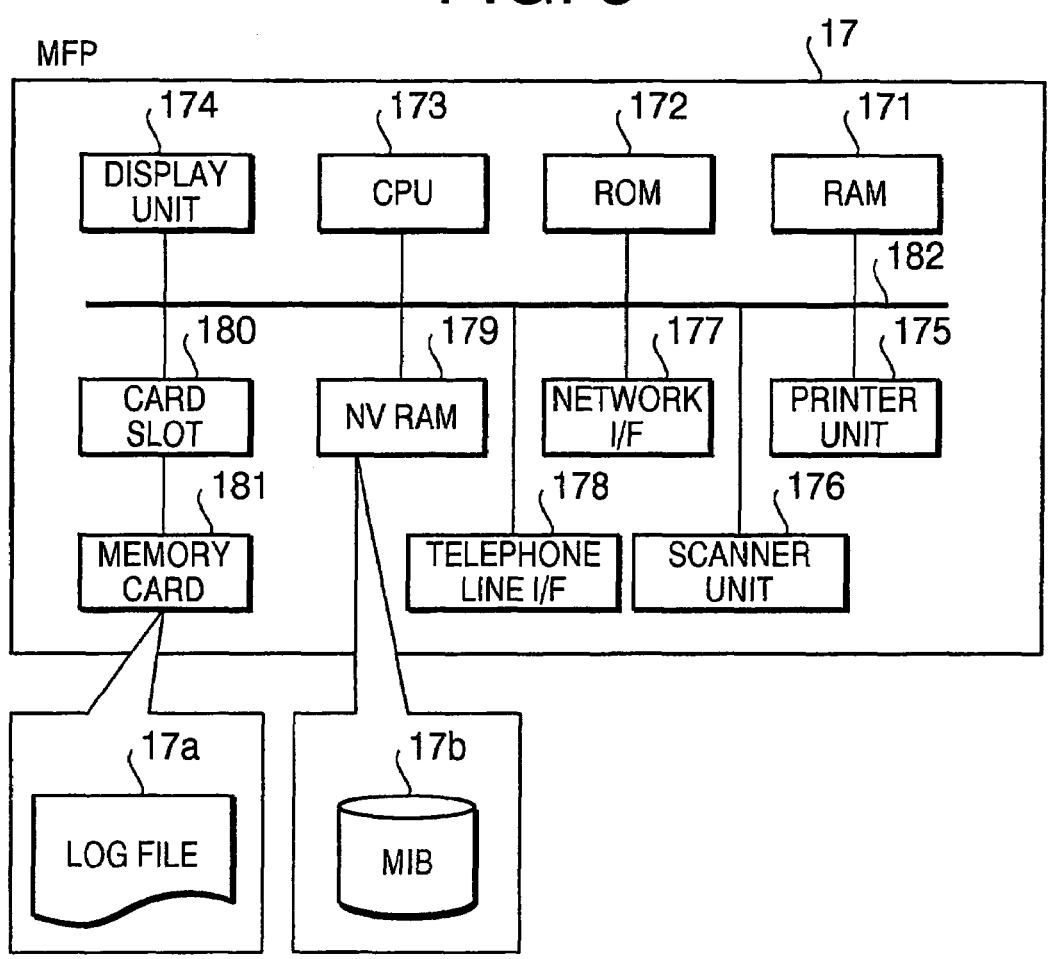
FIG. 5 is a block diagram of an illustrative MFP employed in the log management system shown in FIG. 1.

In FIG. 1, the MFP 17 is connected to the client PC 19 via the USB cable. The MFP 17 is capable of operating in accordance with commands issued by the client PC 19. FIG. 5 is a block diagram showing a configuration of the MFP 17. The MFP 17 includes a RAM 171 (a type of computer-readable medium) mainly used as temporary storage when programs are loaded and executed, a ROM 172 (a type of computer-readable medium) for storing various programs, a CPU 173 which executes the programs, a display unit 174 having, for example, an LCD, to display images, a printing unit 175 which carries out a printing operation on a printing medium, a scanner unit 176 having an image sensor such as a CCD to capture an image, a network I/F 177 which can be connected to external devices through a parallel cable, USB cable or Ethernet cable, a telephone line I/F 178 which interfaces a facsimile communication, a non-volatile RAM 179 (a type of computer-readable medium) storing an MIB (Management Information Base) 17b that is information (log data) notifying status and the like of the MFP 17 to external devices, a card slot 180 which is a slot provided with an interface to a memory card 181 (a type of computer-readable medium) and a bus 182 interconnecting the above elements. In the card slot 180, a memory card 181 storing a log file 17a containing information (log data) related to the MFP 17 is set.

As shown in FIG. 1, the printer 21 is connected to the LAN 25, and receives commands from devices on the LAN 25. The configuration of the printer 21 is substantially the same as that of the printer 15, and description thereof will be omitted.

The MFP 23 is connected to the LAN 25, and receives commands from devices on the LAN 25 to operate. The configuration of the MFP 23 is substantially the same as that of the MFP 17, and description thereof will be omitted.

Next, an operation of the log management system according to the illustrative embodiment will be described with reference to a procedure carried out by the log management program 11a, which is stored in the server PC 11.

Each of the printers 15 and 21, and the MFPs 17 and 23 stores its status and operation history (e.g., print history) as a log file (e.g., log files 15a and 17a), and is configured to output the log file in accordance with a command received from an external device. According to the illustrative embodiment, it is also possible to receive a request for log data and output the log data in response to such a request.

The investigation program 13a stored in the client PC 14 obtains log data (MIB 15b) and/or log file 15a from the printer 15 periodically or when instructed, and stores the same as a log file (e.g., log file 13b) inside the client PC 13. The investigation program 13a is capable of receiving a request for the log file 13b from the log management program 11a stored in the server PC 11, and transmitting the log file 13b to the server PC 11 in response to the request.

Similar to the above, the investigation program 19a stored in the client PC 19 obtains the log data (e.g., MIB 17b) and/or log file 17a periodically or when instructed, and stores the same as a log file in the client PC 19. The investigation program 19a is configured to receive a request for the log file from the log management program 11a stored in the server PC 11, and transmit the log file to the server PC 11 in response to such a request.

Next, the log management program 11a stored in the sever PC 11 will be described in detail. The log management program 11a is retrieved by the CPU 113 from the HDD 117. The log management program 11a has three main functions, which are a log collection function, a log conversion function and a script generation function. The log collection function is to collect log data or log files, and to store the collected data/files as a log file in the HDD 117. The log conversion function is to convert the log file stored in the HDD 117 into a file for registering a database. The script generation function is to generate a script 11b used for converting the log file stored in the HDD 117 to the registration file 11c for registering with the database.

The log collection function is activated when a user inputs a command through the input unit 118 of the server PC 11, when a user inputs a command through another terminal device via the network I/F 116, or when a programmed date and time has come. Specifically, when the log collection function is activated, the log file 13b is obtained from the client PCs 13 and 19 or the log file 15a or the MIB 15b is obtained from the printer 21 or the MFP 23, and the local device log 11d, the network device log 11e, the network device maintenance log 11f and the network device list file 11g are generated and stored in the HDD 117.

Next, the network device maintenance log 11f will be described in detail. FIG. 12 shows an example of the network device maintenance log 11f. As shown in FIG. 12, in a first line of the log, the name of the log data, "View Maintenance Information" is written. In the second line (which is actually a single line in the data, although it is folded and appears to consist of five lines in FIG. 12) includes data items delimited by commas. In the third line and onwards, pieces of data are written delimited by commas in the order of the data items written in the second line.

The data will be described in detail. The items in the second line indicate what the pieces of data in the third line and any following lines respectively represent. The table below shows the items indicated in line 2 and description thereof.

TABLE

| item | description |
| --- | --- |
| Name | a name of a printer or an MFP (e.g., PRN__355618 (line 3), PRN__224156 (line 4)) |
| Device Type | a type of the device (e.g., Br H-57N series (line 3), Br H-65D__DN series (line 4)) |
| IP__Address | an IP address assigned to the device |
| Location | a location of the device (e.g., 5F (line 3), 3F (line 4)) |
| Contact | a telephone number for contact (e.g., 123-2345 (line 3), 123-5432 (line 4)) |
| Serial Number | a serial number of the device (e.g., A00000001 (line 3), B00000001 (line 4)) |

TABLE-continued

| item | description |
| --- | --- |
| MAC_Address | a MAC address assigned to a network I/F of the device |
| Date | the date when the data is generated |
| Page Count | the total number of output pages |
| Drum_Unit_Remaining_Life | the number of pages that the drum unit will be able to output |
| Black_Coverage | a ratio of an area of a fixed toner image to an area of the recording medium |
| Black_Toner_Replace_Count | the number of times black toner has been exchanged |
| Drum_Unit_Replace_Count | the number of times a drum unit has been exchanged |
| Total_Pages_Printed_TRAY_1 | the number of sheets that tray 1 has output |
| Total_Pages_Printed_MP_TRAY | the number of sheets that a multi-purpose tray (to which sheets of various sizes can be set) has output |
| Jam_Total | the number of occurrences of sheet jam |
| PrintPageCount_A4_Letter | the number of output pages of A4 or letter size sheets |
| PrintPageCount_B5_Exe | the number of output pages of B5 or executive size sheets |
| PrintPageCount_Envelopes | the number of output pages of envelope size sheets |
| PrintPageCount_Others | the number of output pages of sheets having other sizes |

The data of each item on the third line and any following lines is indicated such that a character string with a double quotation represents character type data, and other data without the double quotation represents numerical type data. The maintenance log 11*f* may include a plurality of combinations of a name of information (e.g., line 1), item names (e.g., line 2) and data (e.g., lines 3 onwards).

Next, the script generating function will be described. The script generating function is actuated when the user inputs a command through the input unit 118 of the server PC 11. Specifically, on the display unit 114 of the server PC 11, an input screen 401 shown in FIG. 13 is displayed to allow the user to input necessary information. In accordance with the input information, the script 11*b* is generated.

The input screen 401 will now be described with reference to FIG. 13. The input screen 401 includes a text box 402 (compliance with <InFile> tag) in which the user designate an input file, a text box 403 (compliance with <OutFile> tag) in which the user designate an output file, a text box 404 (compliance with <FieldTable> tag) containing contents of a field table (which is a table containing a relationship of field names), a text box 405 (compliance with <MultiField> tag) containing information regarding a complex field (having files names in data lines), a text box 406 (compliance with <DatabaseName> tag) in which the user inputs a database name, a text box 407 (compliance with <DatabaseDescription> tag) in which the user inputs a description regarding the database, a text box 408 (compliance with <TableName> tag) in which the user inputs a table name, a text box 409 (compliance with <TableDescription> tag) in which the user inputs a description regarding the table, a text box 410 (compliance with <RecordsHeader> tag) containing a description of a head of each record, a text box 411 (compliance with <FieldName> tag) in which the user inputs a list of field names and data types of the records, a text box 412 (compliance with <RecordsFooter> tag) containing a description of the end of each record, a command button 413 which is to be operated to close the input screen 401 without generating the script 11*b*, and a command button 414 which is to be operated to generate the script 11*b* and close the input screen 401.

FIGS. 14 and 15 show contents of an example of the script 11*b*, in the script shown in FIGS. 14 and 15, the first two digits of each line denote a line number followed by a description of each line of the script 11*b* with being delimited by a colon ":".

As shown in FIGS. 14 and 15, the entire list is framed with <Template> tag and </Template> tag, and other tags are described therebetween. After each tag, items related to the tag are described. It should be noted that there is only one part framed by <Template> tag and </Template> tag in the list shown in FIGS. 14 and 15. It is possible that a plurality of similar parts may be included in a single script 11*b*.

Next, the log conversion function will be described. The log conversion function is actuated when the user inputs a command by operating the input unit 118 of the server PC 11 or periodically in accordance with a programmed schedule (date and time). A log conversion procedure and an SQL conversion/output procedure, which are executed to achieve the log conversion function, will be described.

(1) Log Conversion Procedure

Figure 6:
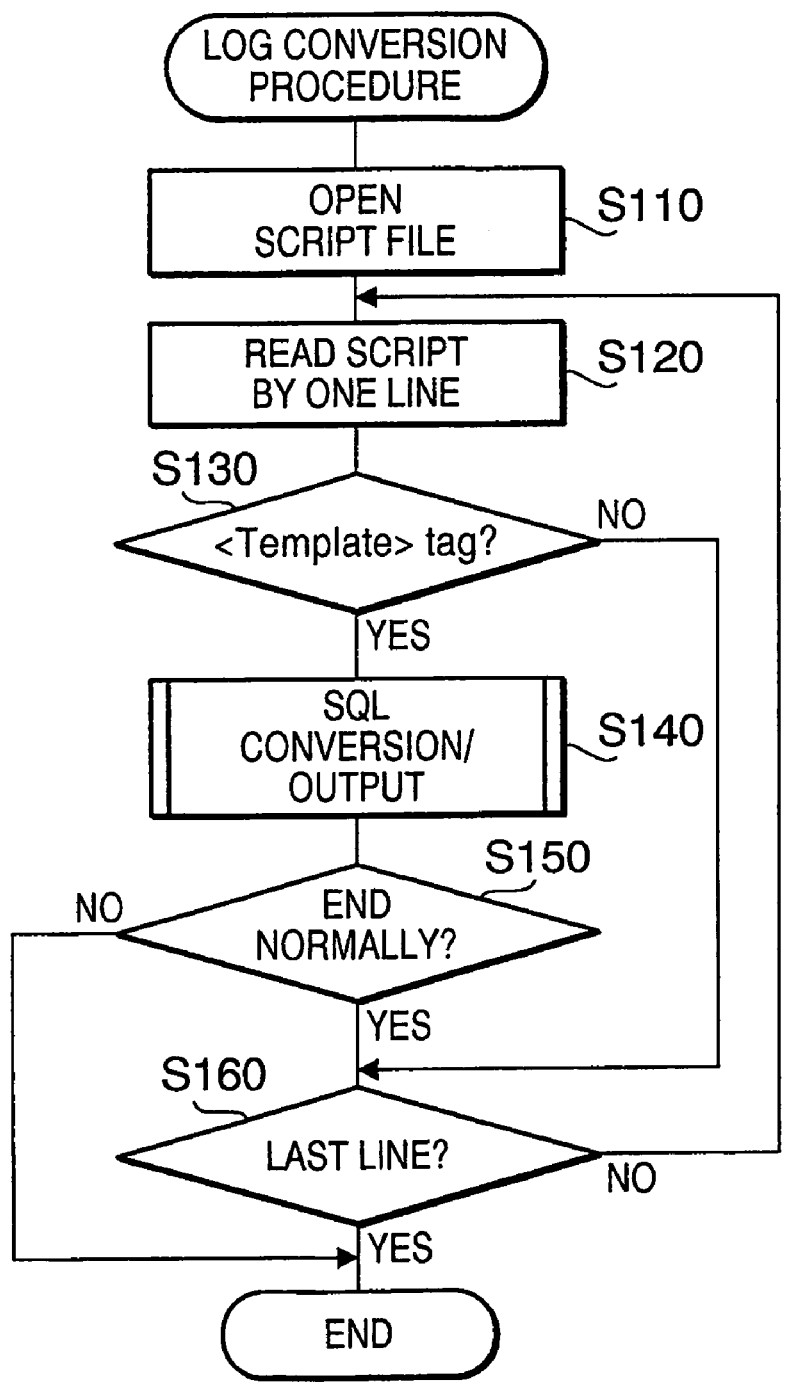
FIGS. 6-11 show a flowchart illustrating an illustrative SQL convert-output process.

FIG. 6 is a flowchart illustrating the log conversion procedure according to the illustrative embodiment.

When the log conversion procedure is started, the CPU 113 opens the file of the script 11*b* stored in the HDD 117, and set the first line of the script 11*b* to a target retrieval line (S110). Next, the CPU 113 retrieves the first line which is set as the target retrieval line, and sets the next line to a target retrieval line (S120).

The CPU 113 judges whether the retrieved line includes a <Template> (S130). If the retrieved line 20 includes the <Template> tag (S130:YES), control proceeds to S140. If the retrieved line 20 does no include the <Template> tag (S130: NO), control proceeds to S160.

In S140, the SQL conversion/output procedure (which is a procedure to retrieve a log file stored in the HDD 117, and output a file 11*c* (SQL file) for registration in accordance with the script 11*b*) is executed. When the SQL conversion/output procedure is completed, control proceeds to S150.

In S150, control judges whether the SQL conversion/output procedure has been completed successfully. According to the illustrative embodiment, this decision is made referring to an error flag, which will be described later. When control determines that the SQL conversion/output procedure has been completed successfully (S150: YES), control proceeds to S160. If control determines that the SQL conversion/output procedure has not been completed successfully (S150: NO), the CPU 113 controls the display unit 114 to display a predetermined message and finishes the log conversion procedure.

In S160, control judges whether the current target retrieval line is the last line of the script 11*b*. If the target retrieval line is the last line of the script 11*b* (S160: YES), control finishes the log conversion procedure. If the target retrieval line is not the last line (S160: NO), control returns to S120.

(2) SQL Conversion/Output Procedure

The SQL conversion/output procedure will be described referring to a flowchart shown in FIG. 7. When the SQL conversion/output procedure is started, the CPU 113 judges whether a <InFile> tag is described within a area between the Template> tag and the </Template> tag corresponding to the <Template> tag in the script 11*b* (which area will be referred to as a subject area, hereinafter) in S201. If the <InFile> tag is described in the subject area (S201:YES), control proceeds to S203. If the <InFile> tag is not described in the subject area (S201: NO), control proceeds to S218. In S218, control sets an error flag. Then, control finishes the SQL conversion/output procedure, and returns to the position of the log conversion procedure (at S140) at which the SQL conversion/output procedure has been called.

In S203, control reads a line following the line of <InFile> tag, and opens a file whose name is described in the read line (e.g., one of the local device log 11d, network device log 11e, network device maintenance log 11f, or network device list file 11g) as an input file.

In S205, control judges whether an <OutFile> tag is described in the subject area of the script 11b. If the <OutFile> tag is described in the subject area (S205: YES), control proceeds to S207. If the <OutFile> tag is not described in the subject area (S205: NO), control proceeds to S218. In S218, control sets an error flag. Then, control finishes the SQL conversion/output procedure, and returns to the position (S140) where the SQL conversion/output procedure is called.

In S207, control reads a line following the line of the <OutFile> tag from the script 11b, and prepares a file having a name which is described in the read line as an output file (which corresponds to a registration file 11c).

In S209, control judges whether a <DatabaseName> tag is described in the subject area of the script 11b. If the <DatabaseName> tag is described (S209: YES), control proceeds to S211. If the <DatabaseName> tag is not described (S209: NO), control proceeds to S213.

In S211, control reads a line following the line of the <DatabaseName> tag from the script 11b, and stores a character string as a database name. Then, control proceeds to S213.

In S213, control judges whether a <DatabaseDescription> tag is described in the subject area of the script 11b. If the <DatabaseDescription> tag is described (S213: YES), control proceeds to S215. If the <DatabaseDescription> tag is not described (S213: NO), control proceeds to S217.

In S215, control reads lines between the <DatabaseDescription> tag to a next tag line by line. While reading the lines, control replaces symbols "%s" with the stored database name, and outputs lines between the tags into the output file. It should be noted that, if the database name has not been stored in S211, the lines read in S215 will not include the symbols "%s". When all the lines between the <DatabaseDescription> tag to the next tag have been output, control proceeds to S217.

In S217, control judges whether the <TableName> tag is described in the subject area of the script 11b. If the <TableName> tag is described (S217: YES), control proceeds to S219. If the <TableName> tag is not described (S217: NO), control proceeds to S221 (FIG. 8).

Figure 8:
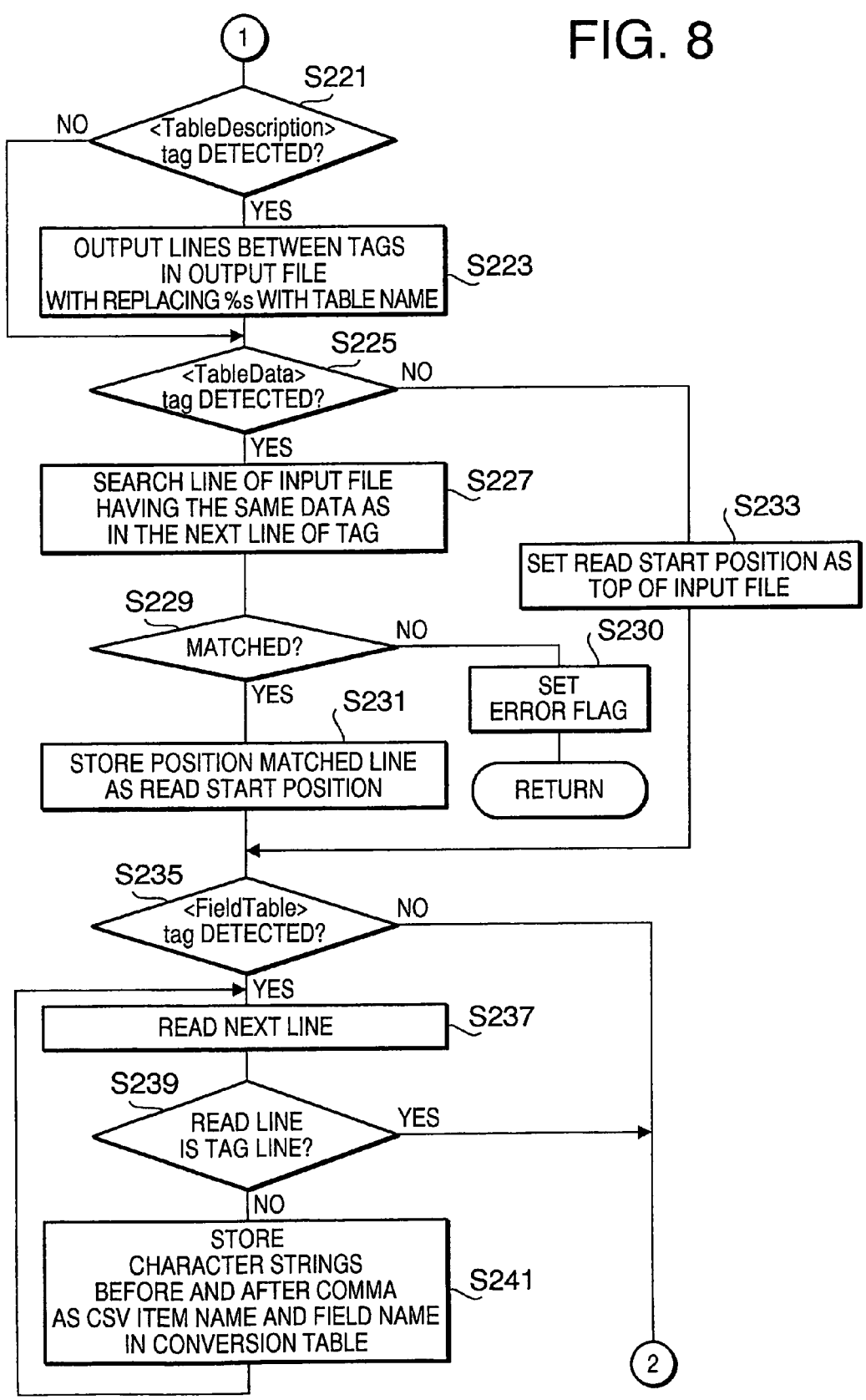

In S219, control reads a line following the line of <TableName> tag from the script 11b, stores a character string described in the read line as a table name, and control proceeds to S221 (see FIG. 8).

In S221 (FIG. 8), control judges whether the <TableDescription> tag is described in the subject area of the script 11b. If the <TableDescription> tag is described in the subject area (S221: YES), control proceeds to S223, otherwise to S225.

In S223, control reads each line between the <TableDescription> tag to the next tag subsequently, and outputs the same after replacing a character string "%s" included in the read line with the table name as stored. It should be noted that if the table name has not been stored in S219, the character string "%s" would not be included in the script 11b. After all the lines between the <TableDescription> tag to the next tag have been output, control proceeds to S225.

In S225, control judges whether the <TableData> tag is described in the subject area of the script 11b. If the <TableData> tag is described (S225: YES), control proceeds to S227, otherwise to S233.

In S233, control stores a start position of an input file, and proceeds to S235.

In S227, control judges whether there is a line, included in the input file, which matches the character string described in the line following the line of the <TableData> tag. If there is such a line (S229: YES), control proceeds to S231, otherwise to S230. In S230, control sets an error flag. Then, control finishes the SQL conversion/output procedure, and returns to the log conversion procedure at a position (i.e., S140) where the SQL conversion/output procedure has been called.

In S231, control stores the position of the line which includes the character string that matches the character string described in the line following the line of the <TableData> tag as a reading start position, and proceeds to S235.

Figure 9:
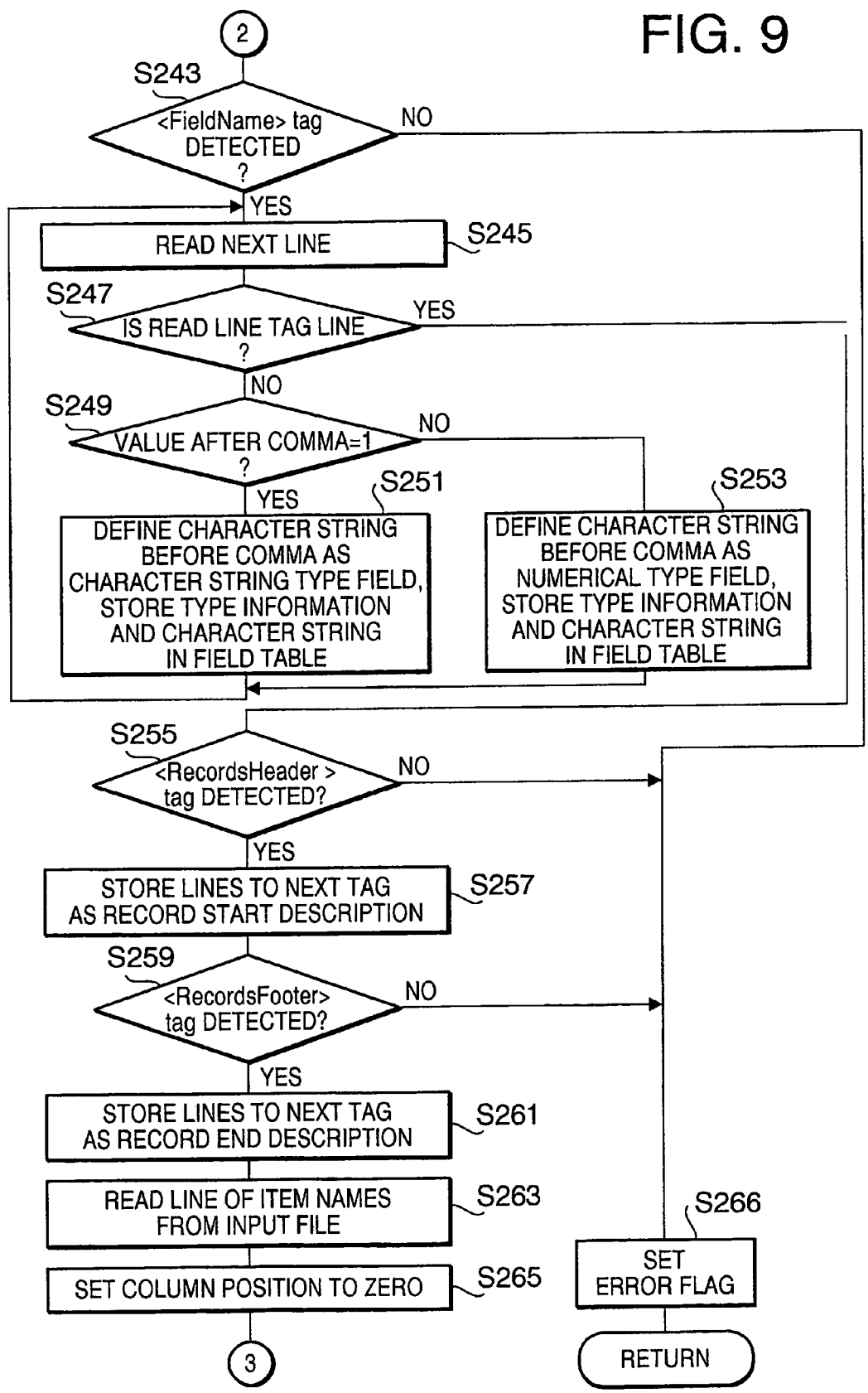

In S235, control judges whether a <FieldTable> tag is described in the subject area of the script 11b. If the <FieldTable> tag is described (S235: YES), control proceeds to S237. If the <FieldTable> tag is not described (S235: NO), control proceeds to S243 (FIG. 9).

In S237, control reads the line following the <FieldTable> tag from the script 11b. Then, control judges whether a tag is described in the read line includes a tag in S239. If a tag is described in the read line (S239: YES), control proceeds to S243 (FIG. 9). If no tags are described in the read line (S239: NO), control proceeds to S241.

In S241, control stores character strings of the read line, before a comma, in a conversion table as CSV items, and character strings after the comma as field names in relation to each other, and returns to S237.

In S243, control judges whether the <FieldName> tag is described in the subject area of the script 11b. If the <FieldName> tag is described, control proceeds to S245. Otherwise, control proceeds to S266, where control sets an error flag, finishes the SQL conversion/output procedure, and returns to the log conversion procedure (S140 of FIG. 6).

In S245, control reads a line following the <FieldName> tag from the script 11b. Then, control judges whether a tag is described in the read line (S247). If a tag is described in the read line (S247: YES), control proceeds to S255, otherwise control proceeds to S249.

In S249, control judges whether a numeral following a comma in the read line is equal to one (1). If the numeral is one, control proceeds to S251. If the numeral is not one, control proceeds to S253.

In S251, character strings of the read line, before a comma, are regarded as character string type fields, and control stores type information and the character strings in relation to each other in the field table. Then, control returns to S245. In S253, character strings of the read line before a comma are regarded as numerical type fields, and control stores type information and the character strings in relation to each other in the field table.

In S255, control judges whether a <RecordsHeader> tag is described in the subject area of the script 11b. If the <RecordsHeader> tag is described (S255: YES), control proceeds to S257. If the <RecordsHeader> tag is not described (S255: NO), control proceeds to S266, where control sets an error flag, finishes the SQL conversion/output procedure, and returns to the log conversion position (S140 of FIG. 6).

In S257, control reads the script 11b from the <RecordsHeader> tag to the next tag line by line, and stores the same as a record start description.

In S259, control judges whether a <RecordsFooter> tag is described in the subject area of the script 11b. If the <RecordsFooter> tag is described (S259: YES), control proceeds to S261. If the <RecordsFooter> tag is not described (S259: NO), control proceeds to S266, where control sets an error flag, finishes the SQL conversion/output procedure, and returns to the log conversion procedure (S140 of FIG. 6).

In S261, control reads the script 11b from the <RecordsFooter> tag to the next tag line by line, and stores the same as a record end description.

Figure 10:
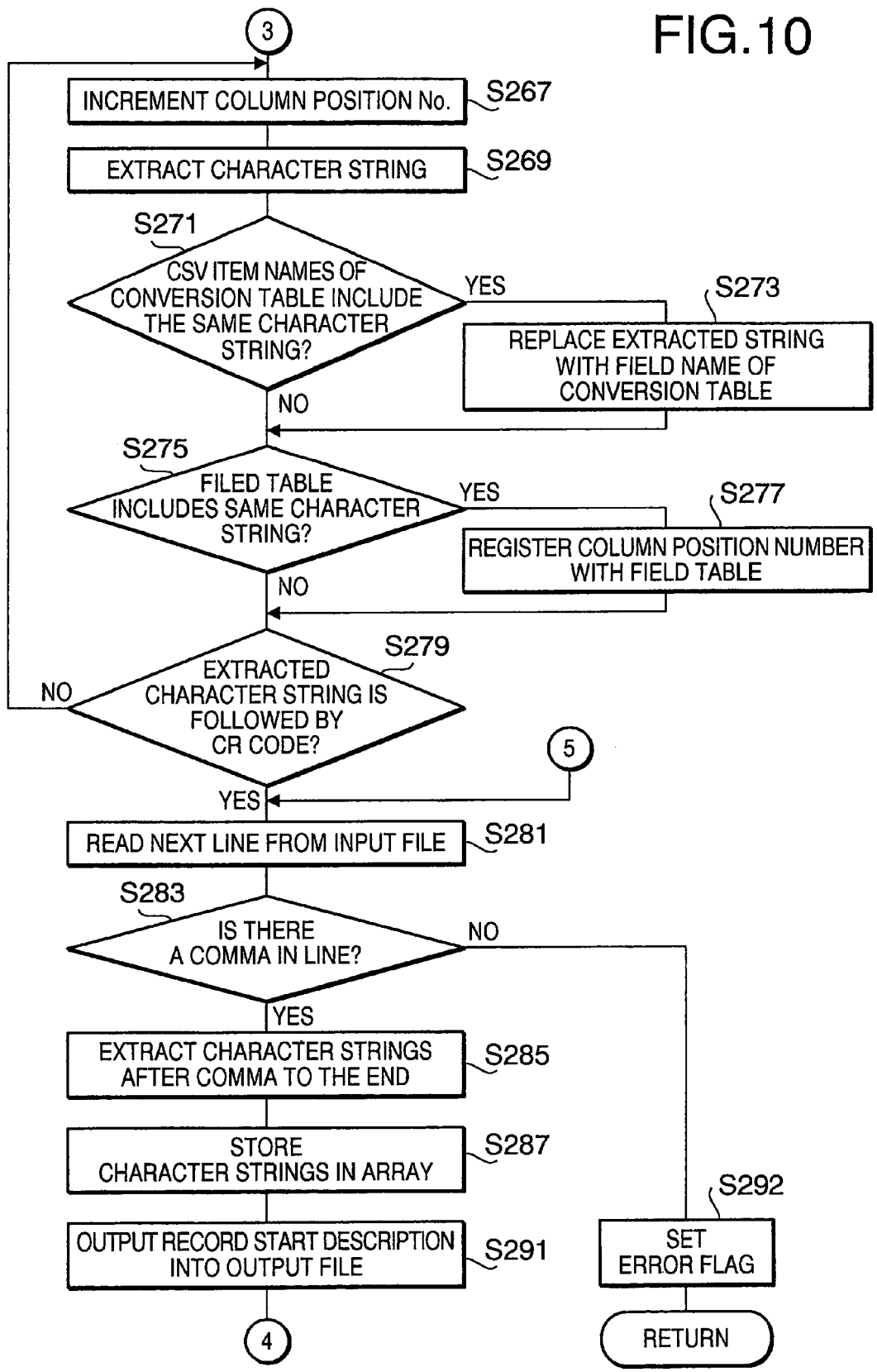

In S263, control retrieves a line of items from the input file. Then, control substitutes 0 (zero) in a column position number, which is a variable (S265). Then, control proceeds to S267 (FIG. 10).

In S267 (FIG. 10), control increments the column position number by one. Then, control extracts character strings from a line of the item input from the input file to an unprocessed comma therein (S269).

In S271, control judges whether there is a character string extracted in S269 which is included in the items of the conversion table. If there is a character string included in the items of the conversion table (S271: YES), control proceeds to S273, otherwise to S275.

In S273, control replaces the extracted character string with a field name of the conversion table and stores the same, and proceeds to S275.

In S275, control judges whether the character string extracted in S269 or the character string (i.e., the field name) replaced in S273 is included in the field table. If such a character string is included in the field table (S275: YES), control proceeds to S277. If such a character string is not included in the field table (S275: NO), control proceeds to S279.

In S277, control registers the character string with the field table with a column position number being related to the character (i.e., the column position number is added in the record of the character string), and proceeds to S279.

In S279, control judges whether there is a carriage return code after the character string extracted in S269. If there is a carriage return code (S279: YES), control proceeds to S281. If there is not the carriage return code (S279: NO), control returns to S267.

In S281, control reads the next line from the input file. Then, control judges whether the read line includes a comma (S283). If there is a comma in the read line (S283: YES), control proceeds to S285, otherwise to S292. In S292, control sets an error flag, finishes the SQL conversion/output procedure, and returns to the log conversion procedure (S140 of FIG. 6).

In S285, control divides the read line at the commas included in the line, and stores the divided portions subsequently in an array (S287). In S291, control output the stored record start description in the output file, and proceeds to S293 (see FIG. 11).

In S293 (FIG. 11), control reads the records which have not yet been read from the field table. It should be noted that when control proceeds to S293 from S291, control initializes the information indicating whether the record has been read.

In S295, control judges whether the column position is registered in the record read in S293. If the column position has been registered (S295: YES), control proceeds to S297. If the column position has not been registered (S295: NO), control proceeds to S307.

In S297, control adds equal (=) in the fields of the record read in S293, and writes the same in the output file. In S299, control obtains a character string using the number of the column position in the record read in S293 as an index.

In S301, control judges whether a field is the character string type or not based on the type information in the record read in S293. If the field is the character string type, control proceeds to S303, otherwise control proceeds to S305.

In S303, control puts the character string obtained in S299 in single quotes, and proceeds to S305. In S305, control adds a carriage return code to the character string, outputs the same in the output file, and proceeds to S307.

In S307, control judges whether there remains a record which has not yet been read from the field table. If there remains a record which has not yet been read in the field table (S307: YES), control returns to S299. If all the records in the field table have been read (S307: NO), control proceeds to S309.

In S309, control outputs the record end description as stored in the output file, and proceeds to S311. In S311, control judges whether there is a succeeding line in the input file. If there is a succeeding line in the input file (S311: YES), control returns to S281 (FIG. 10). If there are no succeeding lines (S311: NO), control finishes the SQL conversion/output procedure, and returns to the log conversion procedure (S140 of FIG. 6).

Example

In the above description, the log conversion procedure and the SQL conversion/output procedure which is called in the long conversion procedure are explained. Hereinafter, a process will be described in which the script 11b shown in FIGS. 14 and 15 is used, and the registration file 11c shown in FIGS. 16 and 17 is output based on the network device maintenance log 11f shown in FIG. 12. It should be noted that the registration destination database with which the registration file 11c is registered is a "WBA_DB". In the database "WBA_DB", three tables, "WBA_NP_Maintenance", "WBA_NetworkPrinterList" and "WBA_LocalPrinter" are included.

When the log conversion procedure is started, the script 11b as shown in FIGS. 14 and 15 is opened, and the first line thereof is read (S120 of FIG. 6). Since the first line of the script 11b is the <Template> tag, process moves to the SQL conversion/output procedure (S130: YES; S140 of FIG. 6).

Figure 7:
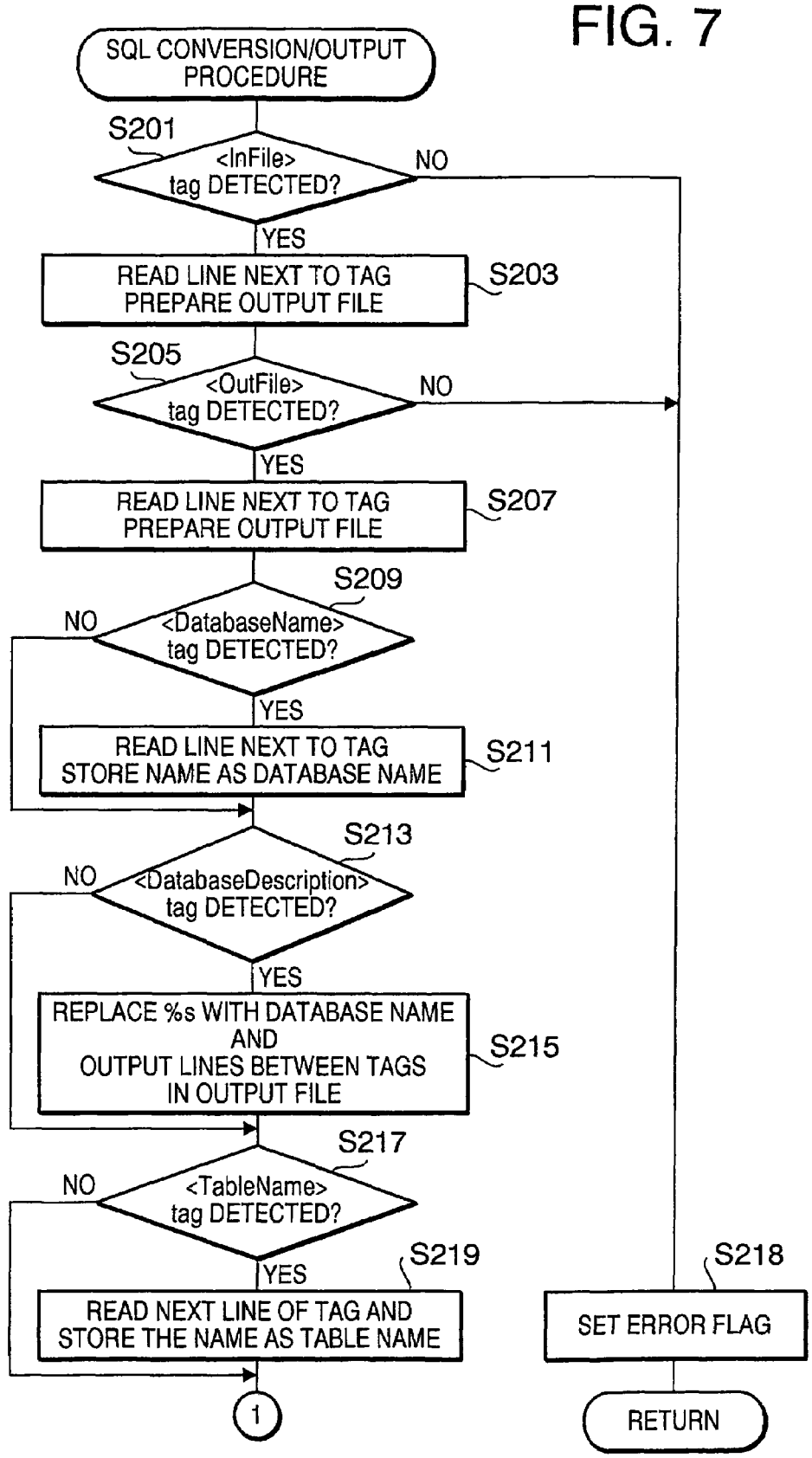

Since the description of the second line of the script 11b (FIG. 14) is the <InFile> tag, control opens the file "printlog.csv" (which corresponds to a network device maintenance log 11f) indicated in the line next to the <InFile> tag (S201 of FIG. 7: YES, S203).

The description of the fourth line of the script 11b (FIG. 14) is the <OutFile> tag. Therefore, control opens the file "sql¥¥printlog.sql" (which corresponds to the registration file 11c) indicated in the line next to the <OutFile> tag (S205: YES, S207).

The description of the sixth line of the script 11b is the <DatabaseName> tag. Accordingly, control stores the character string "WBA_DB" indicated in the line next to the <DatabaseName> tag as the name of the database (S209: YES, S211).

The description of the eighth line of the script 11b is the <DatabaseDescription> tag. Accordingly, control reads the script 11b from the ninth line (which is the next line after the <DatabaseDescription> tag to the twelfth line (which is the line immediately before the next tag), replaces the character string "%s" with the database name, and stores the same in the registration file 11c shown in FIG. 16 (from the first line to the fourth line) (S213: YES, S215).

Next, since the description of the thirteenth line of the script 11b is the <TableName> tag, control stores the character string "WBS_NTP_Maintenance" indicated in the fourteenth line (which is the next line after the <TableName> tag) as the table name (S217: YES, S219).

Since the fifteenth line of the script 11b is the <TableDescription> tag, control reads the script 11b from the sixteenth line (which is the next line after the TableDescription> tag to the forty-first line (which is the line immediately before the next tag), replaces the character string "%s" with the table name, and stores the same in the registration file 11c shown in FIG. 16 (from the fifth line to the thirtieth line) (S221 of FIG. 8: YES, S223).

Next, since the forty-second line of the script 11b indicates the <TableData> tag, control searches the network device maintenance log 11f for a line having a character string "View Maintenance Information" which is indicated in the forty-third line (i.e., the line following the <TableData> tag) (S225: YES, S227).

In this example, since the same character string is included in the network device maintenance log 11f (i.e., the first line of FIG. 12), control stores the line as the reading start position of the network device maintenance log 11f (S229: YES, S231).

The forty-fourth line of the script 11b is the <FieldTable> tag. Accordingly, control sets a portion from the forty-fifth line (which is the line following the <FieldTable> tag) to the forty-sixth line (which is immediately before the next tag) to a conversion table (S237-S241). Specifically, "PrintedPages A4/LETTER" and "PrintePageCount_A4_Letter" are stored as a pair of unconverted and converted data, and "Printed Pages OTHER" and "PrintPageCount_Otheres" are stores as a pair of unconverted and converted data, in the conversion table.

Since the description of the forty-seventh line of the script 11b is the <FieldName> tag, control refers to the script 11b from the forty-eighth line (which is the line following the <FieldName> tag) to the sixty-eighth line (which is immediately before the next tag) and sets the character string, in each line, before a comma as the character string type or numerical type data in the field table which is determined in accordance with the value indicated after the comma (S243-S253 of FIG. 9). For example, the "Name" field is set to the field table as the character string type, while the "Page_count" field is set to the field table as the numerical type.

Since the sixty-ninth line of the script 11b is the <RecordsHeader> tag, control stores the seventieth line (which is the next line following the <RecordsHeader> tag and the seventy-first line (which is immediately before the next tag) as the record start description (S255: YES, S257).

Since the seventy-second line of the script 11b is the <RecordsFooter> tag, control stores the seventy-third line (which is the next line following the <RecordsHeader> tag and is also a line immediately before the next tag) as the record end description (S259: YES, S261).

Next, control reads out from the line (second line) indicating the item names from the network device maintenance log 11f (S263 of FIG. 9). Then, control subsequently extracts character strings delimited by commas (S269 of FIG. 10), and converts each of the extracted character strings in accordance with the conversion table (S271, S273). Further, if the field table includes the same character string (S275: YES), control registers the column position number with the field table (S277 of FIG. 10).

Then, control reads a data line (i.e., the third line) of the network device maintenance log 11f, and each of the character strings delimited by commas is stored in an array (S287).

Next, in the registration file 11c of FIG. 16 (lines 31 and 32), control output the record start description (S291). Thereafter, control generates character strings for output based on the field table and array described above, which are subsequently output in the registration file 11c (from the thirty-second line to the fifty-second line).

Figure 11:
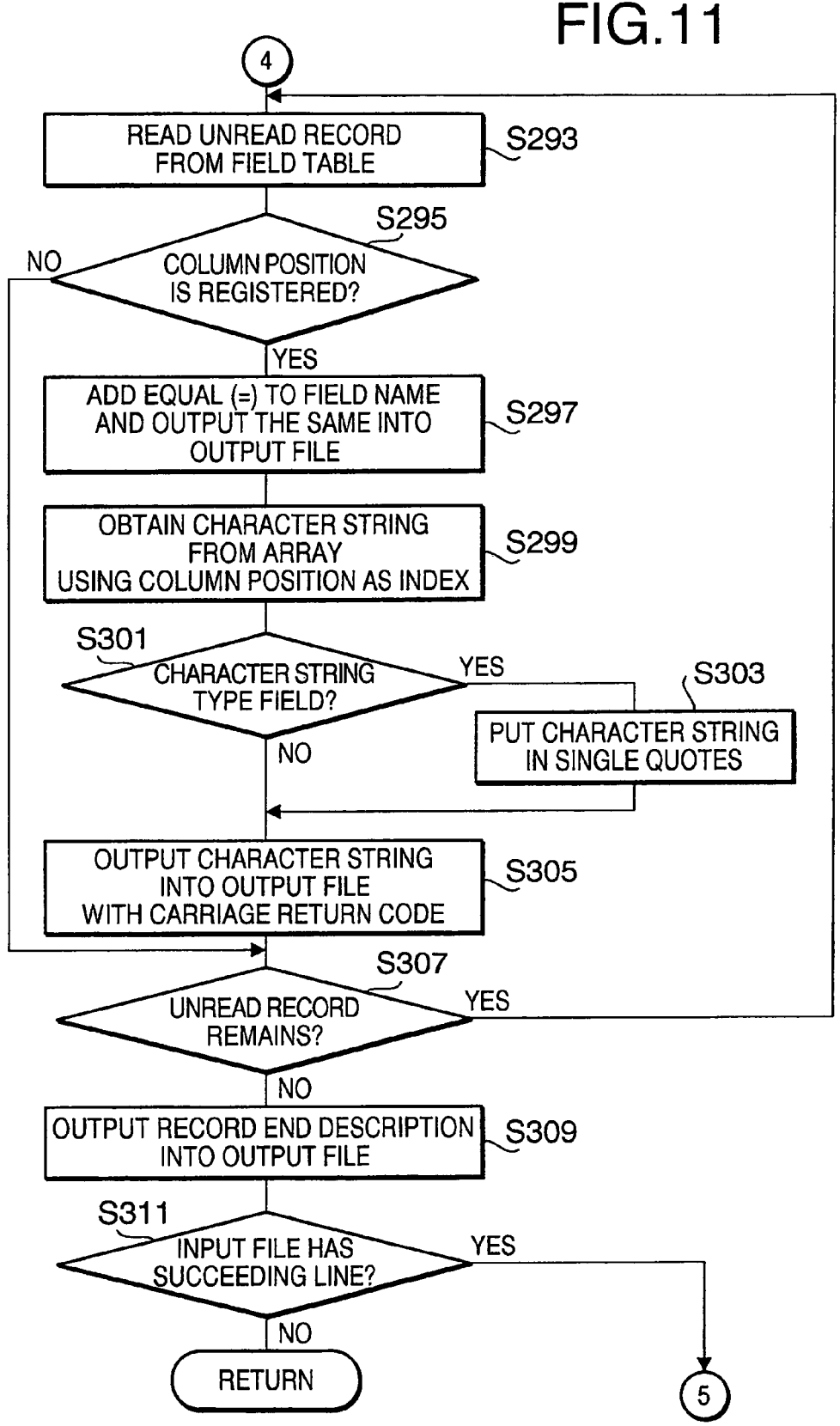
Figure 18:
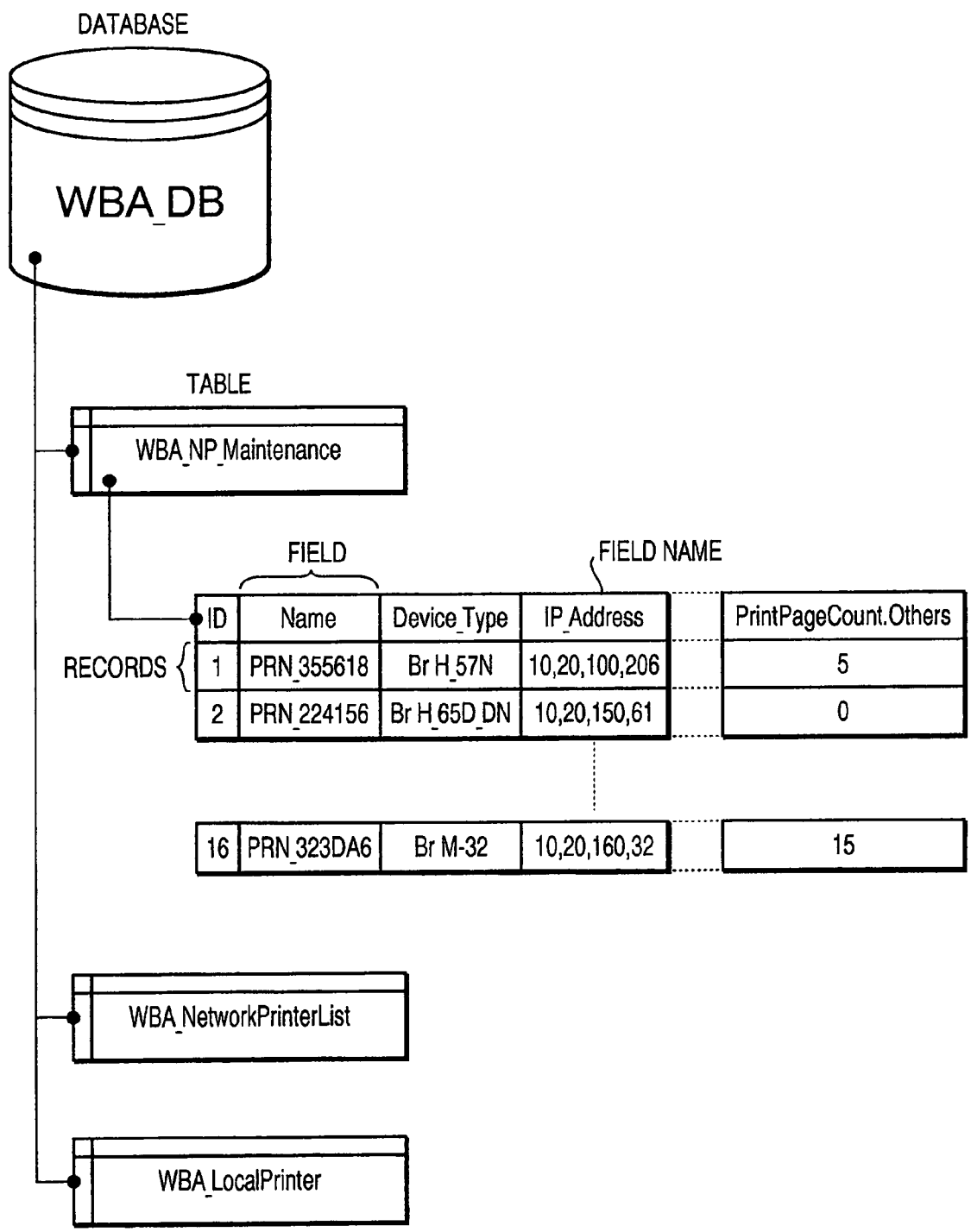
FIG. 18 shows a configuration of a database of a registration destination according to an aspect of an illustrative embodiment.

When all the records of the field table have been output, the record end description is output to the registration file 11c (fifty-second line) shown in FIG. 16 (S309 of FIG. 11). Then, the fourth line of the network device maintenance log 11f (FIG. 12) is read and above-described procedure is repeated so that each line is output in the registration file 11c (from the fifty-third line to the seventy-fourth line) of FIG. 17.

Control then read the fifth line of the network device maintenance log 11f (FIG. 12) and repeats the above-described procedure so that each line is output into the registration file 11c (from seventy-fifth line to ninth-sixth line) shown in FIG. 17.

When all the data lines of the network maintenance log 11f have been processed, the SQL conversion/output procedure is finished. Then, control determines that the decision for each of S150 and S16 is YES, and the conversion procedure is completed.

With the log management program 11a according to the exemplary embodiment described above, by preparing an appropriate script 11b in accordance with the type of the database with which data is registered, it becomes possible to generate a registration file 11c which can be registered with the desired one of various databases. That is, by preparing the script 11b, which can be created easier than a program for generating dedicated registration file, it becomes possible to obtain the registration file (i.e., file 11c for registration) which can be registered with a desired one of various databases. It should be noted that, as the number of the target databases increases, the log management program 11a according to the illustrative embodiment may provide more advantages in comparison with a case where programs for generating the individual registration files need to be prepared, thereby reducing the burden on the system administrator and the like.

Since the names of the corresponding tables and items can be described in the script 11b, even when the table names and/or item names of the registration destination are changed, the administrator is not required to perform troublesome operation. By modifying a part of the script 11b, such a situation can be addressed.

Further, if the script 11b is described appropriately, even if the log file includes a plurality of pieces of log data having different formats, a registration file that can be registered with a single database can be created. Specifically, such a script 11b is configured such that a plurality of pairs of <Template> tag and </Template> tag are described, and all the lines following the <DatabaseName> tags have the same description, and between the <FieldTable> tag and </FieldTable> tag, converted data items correspond to the unconverted data items which are different among a plurality of pieces of log data. With this configuration, even if the log file include a plurality of pieces of log data having different formats, a registration file which can be registered with a single database can be obtained.

Furthermore, if the script 11b is appropriately described, it is possible to register a plurality of pieces of log data having different formats with a single table. In this case, the script 11b is configured to include a plurality of pairs of <Template> tag and </Template> tag, the lines following the <TableName> tags being made identical, and converted data items corresponding to the unconverted data items of the plurality of pieces of log data having different formats between the <FieldTable> tag and </FieldTable> tag. With this configuration, it becomes unnecessary for the administrator to collect data registered with a plurality of different tables, thus reducing the burden on the administrator.

It should be noted that, if the line following the <DatabaseName> tag is described differently, it becomes possible to register the data with a different database. An example of such a configuration will be described with reference to FIG. 19A.

Figure 19A:
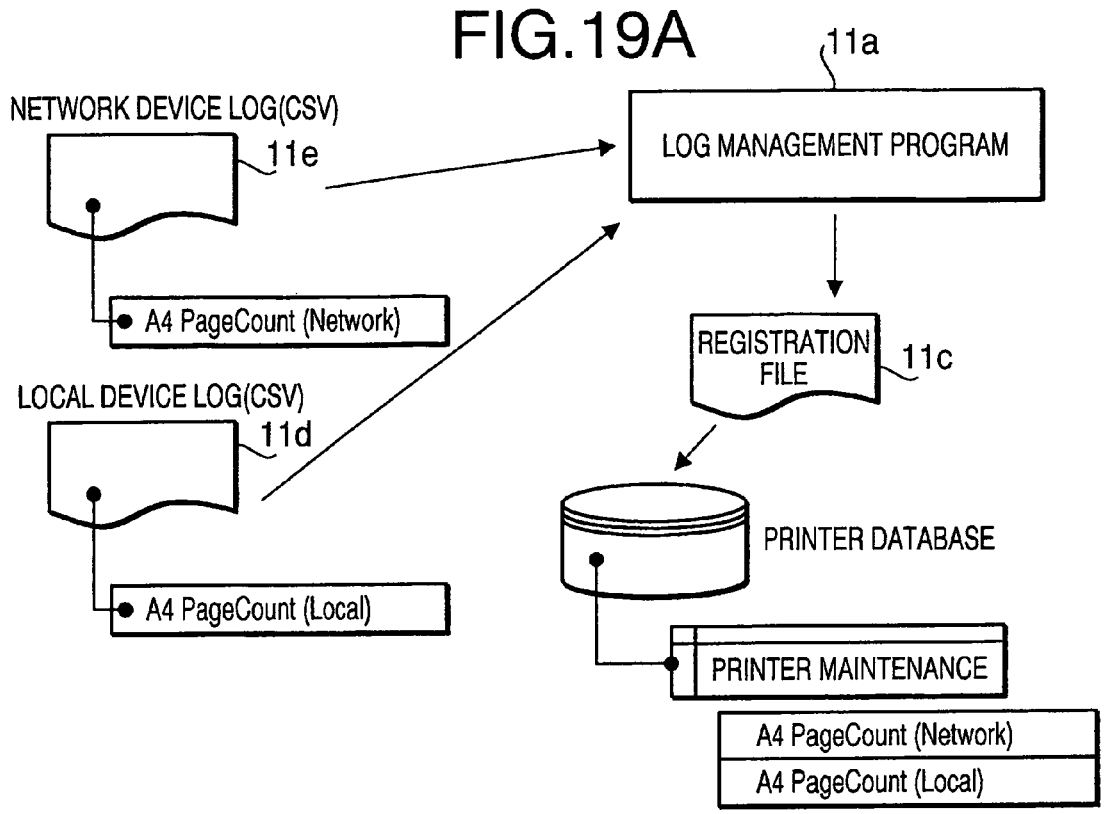
FIGS. 19A and 19B show modifications of the log management system according to aspects of an illustrative embodiment.

As illustrated in FIG. 19A, the log management program 11a reads the network device log 11e and local device log 11d, and outputs the registration file 11c. By registering the registration file 11c with the printer database, the data A4 PageCount (Network) included in the network device log 11e and the data A4 PageCount (Local) included in the local device log 11d can be registered with a printer maintenance table of the printer database.

Still further, if the script is appropriately described (e.g., a plurality of pairs of <Template> tag and </Template> tag are described, and the lines following respective <Template> tags are made different), the same log data can be registered with a plurality of tables. With this configuration, it becomes unnecessary for the data of a certain table to be referred to from another table, which reduces the burden to the administrator. An example of such a configuration will be described referring to FIG. 19B.

Figure 19B:
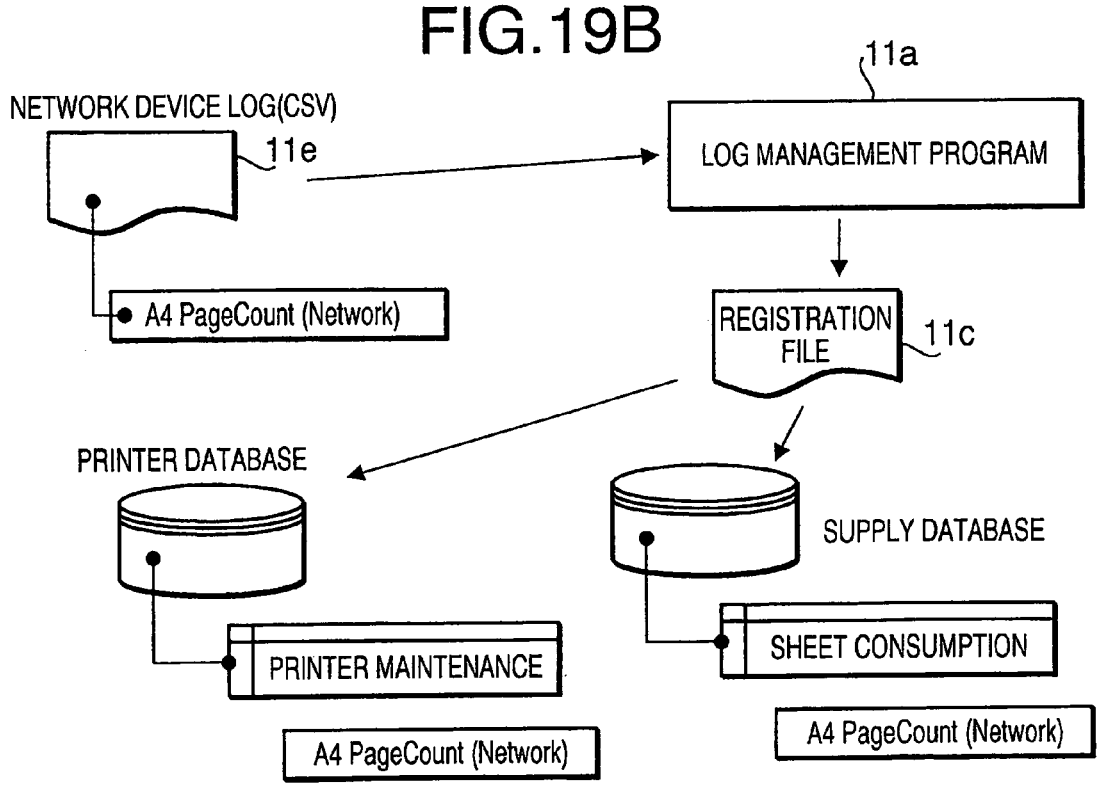

As illustrated in FIG. 19B, the log management program 11a reads the network device log 11e and output the registration file 11c. By registering the registration file 11c with both the printer database and a supply database, the data A4 PageCount (Network), which is included in the network device log 11e, is registered with the printer maintenance table of the printer database and the sheet consumption table of the supply database.

What is claimed is:

1. A computer-readable medium having computer executable instructions stored thereon, said computer executable instructions causing a computer to carry out steps comprising:
   a retrieving step that retrieves a log file from log file storage that stores log data output by at least one device as the log file, the log file being based on a non-SQL specification;
   a converting step that converts the log data contained in the retrieved log file using a script that is stored in a script storage, the script being modifiable by incorporating character strings necessary for converting the log data to a first registration file and a second registration file to be registered with a first database and a second database, respectively, the first and second registration files complying with an SQL specification, said first database complying with the SQL specification and a first language specification, said second database complying with the SQL specification and a second language specification which is different from said first language specification.

2. The computer-readable medium according to claim 1, wherein the at least one device includes a plurality of devices,
   wherein the log file storage stores a plurality of log files corresponding to the plurality of devices, respectively,
   wherein a plurality of pieces of log data contained in the plurality of log files have different formats corresponding to a plurality of types of information provided by the plurality of devices,
   wherein the script stored in the script storage describes the conversion information corresponding to the plurality of types of information, and
   wherein the step of converting further includes the steps of:
   retrieving the log files from the log file storage;
   carrying out the conversion in accordance with the conversion information contained in the script corresponding to the log data to output the registration file.

3. The computer-readable medium according to claim 2, wherein the types of information provided by the plurality of devices depends on at least one of methods of storing the log data of respective devices and a method of providing the log data of respective devices.

4. The computer-readable medium according to claim 2, wherein the types of information provided by the plurality of devices depends on types of respective devices.

5. The computer-readable medium according to claim 2, wherein the script stored in the script storage describes information regarding table items which are described in a table that is generated by conversion corresponding to the log data for each device, and
   wherein the step of converting carries out the conversion such that the description of the information regarding the table items to be registered in the registration file is a description that can be registered in a single table.

6. The computer-readable medium according to claim 2, wherein the script stored in the script storage describes information regarding registration of at least one piece of the plurality of pieces of log data with a plurality of tables, and
   wherein the step of converting carries out the conversion such that the registration file is generated from at least one piece of the plurality of pieces of log data.

7. The computer-readable medium according to claim 1, wherein the device includes an image forming device.

8. The computer-readable medium according to claim 1, further including instructions to cause the computer to carry out steps of obtaining one of the log data and a log file containing the log data and storing the one of the log data and the log file in the log file storage.

9. The computer-readable medium according to claim 1, further including instructions to cause the computer to carry out a step of generating the script based on information input through a graphical user interface and storing the script in the script storage.

10. The computer-readable medium according to claim 1, wherein the script file is a text file.

11. A log management server comprising:
    a storage configured to store computer-executable instructions;
    a processor configured to execute the computer executable instructions,
    wherein the computer-executable instructions cause the log management server to:
    retrieve a log file from log file storage that stores log data output by at least one device as the log file, the log file being based on a non-SQL specification;
    convert the log data contained in the retrieved log file using script that is stored in a script storage, the script being modifiable by incorporating character strings necessary for converting the log data to output a first registration file and a second registration file to be registered with a first database and a second database, respectively, the first and second registration files complying with an SQL specification, said first database complying with the SQL specification and a first language specification, said second database complying with the SQL specification and a second language specification which is different from said first language specification.

12. The log management server according to claim 11, wherein the script file is a text file.

13. A log management system, comprising:
at least one device that outputs log data; and
a log management server having a log file storage that stores the log data output by at least one device and a script storage that stores a script containing conversion information;
wherein log management server executes computer executable instructions that cause the server to carry out the steps of:
a retrieving step that retrieves a log file from the log file storage, the log file being based on a non-SQL specification;
a converting step that converts the log data contained in the retrieved log file using a script that is stored in the script storage, the script being modifiable by incorporating character strings necessary for converting the log data to a first registration file and a second registration file to be registered with a first database and a second database, respectively, the first and second registration files complying with an SQL specification, said first database complying with the SQL specification and a first language specification, said second database complying with the SQL specification and a second language specification which is different from said first language specification.

14. The log management system according to claim 13, wherein the script file is a text file.

15. A method of converting a log file into a registration file to be registered with a first database or a second database, the method comprising:
a retrieving step that retrieves the log file from a log file storage, the log file being based on a non-SQL specification;
a converting step that converts the log data contained in the retrieved log file using a script that is stored in the script storage, the script being modifiable by incorporating character strings necessary for converting the log data to a first registration file and a second registration file to be registered with the first database and the second database, respectively, the first and second registration files complying with an SQL specification, said first database complying with the SQL specification and a first language specification, said second database complying with the SQL specification and a second language specification which is different from said first language specification.

16. The method according to claim 15, wherein the script file is a text file.

17. A computer comprising:
a storage configured to store instructions;
a processor configured to execute the stored instructions, the stored instructions causing the computer to convert a log file based on a non-SQL specification into a registration file that is capable of being registered with a first database or a second database via the computer by retrieving the log file from log file storage that stores log data output by at least one device as the log file, and convening the log data contained in the retrieved log file using a script that is stored in script storage, the script being modifiable by incorporating character strings necessary for converting the log data to a first registration file and a second registration file to be registered with a first database and a second database, respectively, the registration file complying with an SQL specification, said first database complying with the SQL specification and a first language specification, said second database complying with the SQL specification and a second language specification which is different from said first language specification.

18. The computer according to claim 17, wherein the script file is a text file.

19. A computer-readable medium containing computer-readable instructions of a log management program, that when executed by a computer convert a log file into a registration file, the computer including a log file storage means for storing log data output from devices as log files, a script storing means for storing a script in which conversion information for converting a log file into a registration file is written, where each of the log files stores plural pieces of log data corresponding to data item names,
the script file containing:
a database name indicating a database in which the log data is to be stored;
a table name indicating a table in which the log data is to be stored;
field names indicating fields of the table;
correspondence information representing the correspondence between the data item names and the field names;
a first character string which will become a command character string for generating the database indicated by the database name and for declaring the database name as the name of the database to be accessed when the database name is embedded into a predetermined position;
a second character string which will become a command character string for newly generating a table indicated by the table name when the table name is embedded into a predetermined position;
a third character string which will become a command character string for registering the log data into the fields of the table indicated by the table name when the table name is embedded into a predetermined position, and
the log management program is configured to control the computer to perform as:
a first means for generating a command character string, which is a character string made by combining the database name and the first character string, as a first registration character string and storing the command character string in the registration file, wherein a database server newly generates the database indicated by the database name and declares the database name as the name of the database to be accessed, by loading the command character string;
a second means for generating a command character string, which is a character string made by combining the table name and the second character string, as a second registration character string and storing the command character string in the registration file, wherein the database server newly generates the table indicated by the table mime, by loading the command character string; and
a third means for generating a command character string as a third registration character string and storing the command character string in the registration file, wherein the command character string is made by combining a character string which is made by combining log data, which is stored in the log file, and the field name corresponding to the log data, for each piece of log data stored in the log file, based on the correspondence information, and a character string, which is made by combining the table name and the third character string, wherein the database server registers log data to each field corresponding to each field name in the table indicated by the table name, by loading the command character string.

20. The computer-readable medium according to claim 19, wherein the script file includes plural sets of data comprising:
   a log file name;
   a registration file name;
   the database name;
   the table name;
   the field names of the files contained in the table;
   the correspondence information; the first character string;
   the second character string; and
   the third character string;
wherein the plural sets of data are stored in the script file sequentially, and
wherein the log management program lets the computer perform as a control means for operating the first means, the second means, and the third means by making the first means, the second means, and the third means utilize the plural sets of data sequentially from the first set of data to the last set of data.

21. A log server configured to execute the log management program according to claim 19.

22. A log management system comprising:
   devices to output log data; and
   a log management server configured to execute a program according to claim 19, the log management server being provided with a log file storing means for storing the log data output from the devices as a log file, and a script storing means for storing a script in which conversion information is described.

* * * * *